US008677486B2

(12) United States Patent
Olney et al.

(10) Patent No.: US 8,677,486 B2
(45) Date of Patent: Mar. 18, 2014

(54) SYSTEM AND METHOD FOR NEAR-REAL TIME NETWORK ATTACK DETECTION, AND SYSTEM AND METHOD FOR UNIFIED DETECTION VIA DETECTION ROUTING

(75) Inventors: Matthew Olney, Columbia, MD (US); Patrick Mullen, Sykesville, MD (US); Lurene Grenier, Severna Park, MD (US); Nigel Houghton, Potomac Falls, VA (US); Ryan Pentney, Columbia, MD (US)

(73) Assignee: Sourcefire, Inc., Columbia, MD (US)

( * ) Notice: Subject to any disclaimer, the term of this patent is extended or adjusted under 35 U.S.C. 154(b) by 255 days.

(21) Appl. No.: 13/086,819

(22) Filed: Apr. 14, 2011

(65) Prior Publication Data
US 2011/0258702 A1 Oct. 20, 2011

Related U.S. Application Data

(60) Provisional application No. 61/369,215, filed on Jul. 30, 2010, provisional application No. 61/325,020, filed on Apr. 16, 2010.

(51) Int. Cl.
*G06F 21/00* (2013.01)
(52) U.S. Cl.
USPC .............. 726/23; 726/11; 726/13; 726/22; 726/24
(58) Field of Classification Search
USPC .................................. 726/22–25, 9
See application file for complete search history.

(56) References Cited

U.S. PATENT DOCUMENTS 4,550,436 A 10/1985 Freeman
4,570,157 A 2/1986 Kodaira
(Continued)

FOREIGN PATENT DOCUMENTS

EP 1 548 998 A1 6/2005
EP 2166725 A1 3/2010
(Continued)

OTHER PUBLICATIONS

Martin Roesch, "Snort-Lightwieght Intrusion Detection for Networks", Proceedings of LISA '99: 13th System Administration Conference, Nov. 12, 1999, pp. 229-238 http://citeseerx.ist.psu.edu/viewdoc/summary?doi=10.1.1.105.6212.*

(Continued)

*Primary Examiner* — Jung Kim
*Assistant Examiner* — Carlos M De Jesus, Jr.
(74) *Attorney, Agent, or Firm* — Posz Law Group, PLC

(57) ABSTRACT

A system includes a processor. The processor is configured to receive network traffic that includes a data block. The processor will generate a unique identifier (UID) for the file that includes a hash value corresponding to the file. The processor will determine whether the file is indicated as good or bad with the previously-stored UID. The processor will call a file-type specific detection nugget corresponding to the file's file-type to perform a full file inspection to detect whether the file is good or bad and store a result of the inspection together with the UID of the file, when the file is determined to be not listed in the previously-stored UIDs. The processor will not call the file-type specific detection nugget when the file's indicator is "good" or "bad" in the previously-stored UIDs. The processor will issue an alert about the bad file when the file's indicator is "bad".

24 Claims, 12 Drawing Sheets

(56) References Cited

U.S. PATENT DOCUMENTS

| | | |
|---|---|---|
| 4,857,912 A | 8/1989 | Everett et al. |
| 4,912,748 A | 3/1990 | Horii et al. |
| 4,985,863 A | 1/1991 | Fujisawa et al. |
| 5,193,192 A | 3/1993 | Seberger |
| 5,222,081 A | 6/1993 | Lewis et al. |
| 5,404,488 A | 4/1995 | Kerrigan et al. |
| 5,430,842 A | 7/1995 | Thompson et al. |
| 5,459,841 A | 10/1995 | Flora-Holmquist et al. |
| 5,495,409 A | 2/1996 | Kanno |
| 5,497,463 A | 3/1996 | Stein et al. |
| 5,604,910 A | 2/1997 | Kojima et al. |
| 5,646,997 A | 7/1997 | Barton |
| 5,666,293 A | 9/1997 | Metz et al. |
| 5,796,942 A | 8/1998 | Esbensen |
| 5,870,554 A | 2/1999 | Grossman et al. |
| 5,881,269 A | 3/1999 | Dobbelstein |
| 5,901,307 A | 5/1999 | Potter et al. |
| 5,917,821 A | 6/1999 | Gobuyan et al. |
| 5,919,257 A | 7/1999 | Trostle |
| 5,963,942 A | 10/1999 | Igata |
| 5,987,473 A | 11/1999 | Jorgensen |
| 5,995,963 A | 11/1999 | Nanba et al. |
| 5,999,937 A | 12/1999 | Ellard |
| 6,002,427 A | 12/1999 | Kipust |
| 6,141,686 A | 10/2000 | Jackowski et al. |
| 6,199,181 B1 | 3/2001 | Rechef et al. |
| 6,219,786 B1 | 4/2001 | Cunningham et al. |
| 6,240,452 B1 | 5/2001 | Welch, Jr. et al. |
| 6,259,805 B1 | 7/2001 | Freedman et al. |
| 6,321,338 B1 | 11/2001 | Porras et al. |
| 6,324,656 B1 | 11/2001 | Gleichauf et al. |
| 6,334,121 B1 | 12/2001 | Primeaux et al. |
| 6,343,362 B1 | 1/2002 | Ptacek et al. |
| 6,393,474 B1 | 5/2002 | Eichert et al. |
| 6,415,321 B1 | 7/2002 | Gleichauf et al. |
| 6,453,354 B1 | 9/2002 | Jiang et al. |
| 6,477,648 B1 | 11/2002 | Schell et al. |
| 6,487,666 B1 | 11/2002 | Shanklin et al. |
| 6,499,107 B1 | 12/2002 | Gleichauf et al. |
| 6,539,381 B1 | 3/2003 | Prasad et al. |
| 6,546,493 B1 | 4/2003 | Magdych et al. |
| 6,587,876 B1 | 7/2003 | Mahon et al. |
| 6,590,885 B1 | 7/2003 | Jorgensen |
| 6,678,734 B1 | 1/2004 | Haatainen et al. |
| 6,678,824 B1 | 1/2004 | Cannon et al. |
| 6,684,332 B1 | 1/2004 | Douglas |
| 6,711,127 B1 | 3/2004 | Gorman et al. |
| 6,754,826 B1 | 6/2004 | Challenger et al. |
| 6,766,320 B1 | 7/2004 | Wang et al. |
| 6,772,196 B1 | 8/2004 | Kirsch et al. |
| 6,789,202 B1 | 9/2004 | Ko et al. |
| 6,816,973 B1 | 11/2004 | Gleichauf et al. |
| 6,851,061 B1 | 2/2005 | Holland et al. |
| 6,957,348 B1 | 10/2005 | Flowers et al. |
| 6,983,323 B2 | 1/2006 | Cantrell et al. |
| 6,993,706 B2 | 1/2006 | Cook |
| 6,999,998 B2 | 2/2006 | Russell |
| 7,032,114 B1 | 4/2006 | Moran |
| 7,047,423 B1 | 5/2006 | Maloney et al. |
| 7,054,930 B1 | 5/2006 | Cheriton |
| 7,058,821 B1 | 6/2006 | Parekh et al. |
| 7,065,657 B1 | 6/2006 | Moran |
| 7,073,198 B1 | 7/2006 | Flowers et al. |
| 7,076,803 B2 | 7/2006 | Bruton et al. |
| 7,096,503 B1 | 8/2006 | Magdych et al. |
| 7,113,789 B1 | 9/2006 | Boehmke |
| 7,120,635 B2 | 10/2006 | Bhide et al. |
| 7,133,916 B2 | 11/2006 | Schunemann |
| 7,134,141 B2 | 11/2006 | Crosbie et al. |
| 7,152,105 B2 | 12/2006 | McClure et al. |
| 7,174,566 B2 | 2/2007 | Yadav |
| 7,181,769 B1 | 2/2007 | Keanini et al. |
| 7,231,665 B1 | 6/2007 | McArdle et al. |
| 7,243,148 B2 | 7/2007 | Keir et al. |
| 7,257,630 B2 | 8/2007 | Cole et al. |
| 7,305,708 B2 * | 12/2007 | Norton et al. .................. 726/23 |
| 7,310,688 B1 | 12/2007 | Chin |
| 7,313,695 B2 | 12/2007 | Norton et al. |
| 7,315,801 B1 | 1/2008 | Dowd et al. |
| 7,317,693 B1 | 1/2008 | Roesch et al. |
| 7,346,922 B2 | 3/2008 | Miliefsky |
| 7,350,077 B2 | 3/2008 | Meier et al. |
| 7,363,656 B2 | 4/2008 | Weber et al. |
| 7,365,872 B2 | 4/2008 | Lawrence et al. |
| 7,467,202 B2 | 12/2008 | Savchuk |
| 7,467,205 B1 | 12/2008 | Dempster et al. |
| 7,467,410 B2 | 12/2008 | Graham et al. |
| 7,493,388 B2 | 2/2009 | Wen et al. |
| 7,496,662 B1 | 2/2009 | Roesch et al. |
| 7,496,962 B2 | 2/2009 | Roelker et al. |
| 7,519,954 B1 | 4/2009 | Beddoe et al. |
| 7,539,681 B2 | 5/2009 | Norton et al. |
| 7,580,370 B2 | 8/2009 | Boivie et al. |
| 7,594,273 B2 | 9/2009 | Keanini et al. |
| 7,596,807 B2 | 9/2009 | Ptacek et al. |
| 7,644,275 B2 | 1/2010 | Mowers et al. |
| 7,664,845 B2 | 2/2010 | Kurtz et al. |
| 7,673,043 B2 | 3/2010 | Keir et al. |
| 7,680,929 B1 | 3/2010 | Lyon |
| 7,701,945 B2 | 4/2010 | Roesch et al. |
| 7,716,742 B1 | 5/2010 | Roesch et al. |
| 7,730,011 B1 | 6/2010 | Deninger et al. |
| 7,730,175 B1 | 6/2010 | Roesch et al. |
| 7,733,803 B2 | 6/2010 | Vogel, III et al. |
| 7,801,980 B1 | 9/2010 | Roesch et al. |
| 7,805,482 B2 | 9/2010 | Schiefer |
| 7,805,762 B2 | 9/2010 | Rowland |
| 7,831,522 B1 | 11/2010 | Satish et al. |
| 7,885,190 B1 | 2/2011 | Roesch et al. |
| 7,904,942 B2 * | 3/2011 | Sun et al. ........................ 726/1 |
| 7,949,732 B1 | 5/2011 | Roesch et al. |
| 8,020,211 B2 | 9/2011 | Keanini et al. |
| 8,041,773 B2 | 10/2011 | Abu-Ghazaleh et al. |
| 8,150,039 B2 * | 4/2012 | de Cesare et al. ............. 380/277 |
| 8,272,055 B2 | 9/2012 | Wease |
| 8,289,882 B2 | 10/2012 | Vogel, III et al. |
| 8,433,790 B2 | 4/2013 | Polley et al. |
| 2001/0027485 A1 | 10/2001 | Ogishi et al. |
| 2001/0034847 A1 | 10/2001 | Gaul, Jr. |
| 2002/0035639 A1 | 3/2002 | Xu |
| 2002/0066034 A1 | 5/2002 | Schlossberg |
| 2002/0083344 A1 | 6/2002 | Vairavan |
| 2002/0087716 A1 | 7/2002 | Mustafa |
| 2002/0112185 A1 | 8/2002 | Hodges |
| 2002/0123995 A1 | 9/2002 | Shibuya |
| 2002/0143918 A1 | 10/2002 | Soles et al. |
| 2002/0144142 A1 | 10/2002 | Shohat |
| 2002/0165707 A1 | 11/2002 | Call |
| 2002/0168082 A1 | 11/2002 | Razdan |
| 2002/0178271 A1 | 11/2002 | Graham et al. |
| 2003/0009699 A1 | 1/2003 | Gupta et al. |
| 2003/0014662 A1 | 1/2003 | Gupta et al. |
| 2003/0046388 A1 | 3/2003 | Milliken |
| 2003/0065817 A1 | 4/2003 | Benchetrit et al. |
| 2003/0083847 A1 | 5/2003 | Schertz et al. |
| 2003/0093517 A1 | 5/2003 | Tarquini et al. |
| 2003/0101353 A1 | 5/2003 | Tarquini et al. |
| 2003/0126472 A1 | 7/2003 | Banzhof |
| 2003/0140250 A1 | 7/2003 | Taninaka et al. |
| 2003/0195874 A1 | 10/2003 | Akaboshi |
| 2003/0212779 A1 | 11/2003 | Boyter et al. |
| 2003/0212910 A1 | 11/2003 | Rowland et al. |
| 2003/0217283 A1 | 11/2003 | Hrastar et al. |
| 2003/0229726 A1 | 12/2003 | Daseke et al. |
| 2004/0010684 A1 | 1/2004 | Douglas |
| 2004/0015728 A1 | 1/2004 | Cole et al. |
| 2004/0034773 A1 | 2/2004 | Balabine et al. |
| 2004/0064726 A1 | 4/2004 | Girouard |
| 2004/0073800 A1 | 4/2004 | Shah et al. |
| 2004/0093408 A1 | 5/2004 | Hirani et al. |
| 2004/0093582 A1 | 5/2004 | Segura |
| 2004/0098618 A1 | 5/2004 | Kim et al. |
| 2004/0117478 A1 | 6/2004 | Triulzi et al. |
| 2004/0123153 A1 | 6/2004 | Wright et al. |

(56) References Cited

U.S. PATENT DOCUMENTS

| | | |
|---|---|---|
| 2004/0172234 A1 | 9/2004 | Dapp et al. |
| 2004/0179477 A1 | 9/2004 | Lincoln et al. |
| 2004/0193943 A1 | 9/2004 | Angelino et al. |
| 2004/0210756 A1 | 10/2004 | Mowers et al. |
| 2004/0218532 A1 | 11/2004 | Khirman |
| 2004/0221176 A1 | 11/2004 | Cole |
| 2004/0250032 A1 | 12/2004 | Ji et al. |
| 2004/0268358 A1 | 12/2004 | Darling et al. |
| 2005/0005169 A1 | 1/2005 | Kelekar |
| 2005/0015623 A1 | 1/2005 | Williams et al. |
| 2005/0044422 A1 | 2/2005 | Cantrell et al. |
| 2005/0055399 A1 | 3/2005 | Savchuk |
| 2005/0076066 A1 | 4/2005 | Stakutis et al. |
| 2005/0108393 A1 | 5/2005 | Banerjee et al. |
| 2005/0108554 A1* | 5/2005 | Rubin et al. .................. 713/187 |
| 2005/0108573 A1 | 5/2005 | Bennett et al. |
| 2005/0113941 A1 | 5/2005 | Ii et al. |
| 2005/0114700 A1 | 5/2005 | Barrie et al. |
| 2005/0160095 A1 | 7/2005 | Dick et al. |
| 2005/0172019 A1 | 8/2005 | Williamson et al. |
| 2005/0188079 A1 | 8/2005 | Motsinger et al. |
| 2005/0223014 A1 | 10/2005 | Sharma et al. |
| 2005/0229255 A1 | 10/2005 | Gula et al. |
| 2005/0240604 A1 | 10/2005 | Corl, Jr. et al. |
| 2005/0251500 A1 | 11/2005 | Vahalia et al. |
| 2005/0268331 A1 | 12/2005 | Le et al. |
| 2005/0268332 A1 | 12/2005 | Le et al. |
| 2005/0273673 A1 | 12/2005 | Gassoway |
| 2005/0273857 A1 | 12/2005 | Freund |
| 2006/0174337 A1 | 8/2006 | Bernoth |
| 2006/0265748 A1 | 11/2006 | Potok |
| 2006/0288053 A1 | 12/2006 | Holt et al. |
| 2006/0294588 A1 | 12/2006 | Lahann et al. |
| 2007/0027913 A1 | 2/2007 | Jensen et al. |
| 2007/0058631 A1 | 3/2007 | Mortier et al. |
| 2007/0143852 A1 | 6/2007 | Keanini et al. |
| 2007/0150948 A1* | 6/2007 | De Spiegeleer ................ 726/22 |
| 2007/0162463 A1 | 7/2007 | Kester et al. |
| 2007/0192286 A1 | 8/2007 | Norton et al. |
| 2007/0192863 A1 | 8/2007 | Kapoor et al. |
| 2007/0195797 A1 | 8/2007 | Patel et al. |
| 2007/0271371 A1 | 11/2007 | Singh Ahuja et al. |
| 2007/0283007 A1 | 12/2007 | Keir et al. |
| 2007/0283441 A1 | 12/2007 | Cole et al. |
| 2007/0288579 A1 | 12/2007 | Schunemann |
| 2008/0115213 A1 | 5/2008 | Bhatt et al. |
| 2008/0127342 A1 | 5/2008 | Roesch et al. |
| 2008/0133523 A1 | 6/2008 | Norton et al. |
| 2008/0168561 A1 | 7/2008 | Durie et al. |
| 2008/0196102 A1* | 8/2008 | Roesch ........................... 726/23 |
| 2008/0209518 A1 | 8/2008 | Sturges et al. |
| 2008/0244741 A1 | 10/2008 | Gustafson et al. |
| 2008/0263197 A1 | 10/2008 | Stephens |
| 2008/0276319 A1 | 11/2008 | Rittermann |
| 2008/0289040 A1 | 11/2008 | Ithal |
| 2009/0019141 A1 | 1/2009 | Bush et al. |
| 2009/0028147 A1 | 1/2009 | Russell |
| 2009/0041020 A1 | 2/2009 | Gibbons et al. |
| 2009/0055691 A1 | 2/2009 | Ouksel et al. |
| 2009/0097662 A1* | 4/2009 | Olechowski et al. ......... 380/286 |
| 2009/0164517 A1 | 6/2009 | Shields et al. |
| 2009/0171981 A1 | 7/2009 | Shuster |
| 2009/0182864 A1 | 7/2009 | Khan et al. |
| 2009/0259748 A1 | 10/2009 | McClure et al. |
| 2009/0262659 A1 | 10/2009 | Sturges et al. |
| 2009/0271696 A1 | 10/2009 | Bailor et al. |
| 2009/0282481 A1 | 11/2009 | Dow et al. |
| 2009/0307776 A1* | 12/2009 | Curnyn ........................... 726/24 |
| 2009/0320138 A1 | 12/2009 | Keanini et al. |
| 2010/0050260 A1 | 2/2010 | Nakakoji et al. |
| 2010/0077483 A1 | 3/2010 | Stolfo et al. |
| 2010/0088767 A1 | 4/2010 | Wease |
| 2010/0161795 A1 | 6/2010 | Deridder et al. |
| 2010/0205675 A1 | 8/2010 | Vogel, III et al. |
| 2010/0257267 A1 | 10/2010 | Sohn et al. |
| 2010/0268834 A1 | 10/2010 | Eidelman et al. |
| 2011/0307600 A1 | 12/2011 | Polley et al. |
| 2011/0314143 A1 | 12/2011 | Vogel, III et al. |
| 2012/0233222 A1 | 9/2012 | Roesch |

FOREIGN PATENT DOCUMENTS

| | | |
|---|---|---|
| GB | 2 432 933 A | 6/2007 |
| WO | WO 01/37511 A2 | 5/2001 |
| WO | WO 2004/100011 A | 11/2004 |
| WO | WO 2005/064884 A1 | 7/2005 |
| WO | WO 2006/025050 A2 | 3/2006 |
| WO | WO 2009/032925 A1 | 3/2009 |

OTHER PUBLICATIONS

Tool et al., "Intrusion Detection Systems", Information Assurance tools Report; 6th edition, Sep. 2009, 1-87 http://iac.dtic.mil/csiac/download/intrusion_detection.pdf.*

Etienne et al., "Malicious Traffic Detection in Local Networks with Snort", 2009 http://infoscience.epfl.ch/record/141022.*

Kipp et al., "Using Snort as an IDS and Network Monitor in Linux", 2009, 1-4 http://citeseerx.ist.psu.edu/viewdoc/download?doi=10.1.1.3.616&rep=rep1&type=pdf.*

Notice of Allowance issued by the U.S. Patent Office on Jun. 25, 2012 in connection with related U.S. Appl. No. 12/688,400.

International Search Report and Written Opinion of the International Searching Authority issued on Sep. 1, 2011 in connection with PCT application No. PCT/US2011/035874, which corresponds to U.S. Appl. No. 12/820,227.

Francois Gagnon et al.: "A Hybrid Approach to Operating System Discovery using Answer Set Programming", Integrated Network Management, 2007. IM'07, 10$^{th}$ IFIP/IEEE International Symposium on, IEEE, PI, May 1, 2007, pp. 391-400, XP031182713, ISBN: 978-1-4244-0798-9, p. 293, 394-397.

Final Office Action issued by the U.S. Patent Office on Sep. 14, 2011 in connection with related U.S. Appl. No. 12/230,338.

Office Action issued by the U.S. Patent Office on Oct. 21, 2011 in connection with related U.S. Appl. No. 12/969,682.

Notice of Allowance issued by the Japanese Patent Office on Sep. 30, 2011 in connection with Japanese Patent Application No. 2007-523640, which corresponds to related U.S. Appl. No. 10/898,220, now U.S. Patent No. 7,539,681.

Notice of Allowance issued the by U.S. Patent Office on Oct. 28, 2011 in connection with related U.S. Appl. No. 12/149,196.

Advisory Action issued by the U.S. Patent Office on Nov. 28, 2011 in connection with related U.S. Appl. No. 12/230,338.

Office Action issued by the U.S. Patent Office on Oct. 15, 2012 in connection with related U.S. Appl. No. 12/230,338.

International Preliminary Report on Patentability mailed by the International Bureau of WIPO on Oct. 26, 2012, in connection with corresponding PCT application No. PCT/US2011/032489.

Office Action issued by the U.S. Patent Office on Nov. 6, 2012 in connection with related U.S. Appl. No. 12/820,227.

Li, Zhichun, et al. Netshield: Matching with a large vulnerability signature ruleset for high performance network defense. Technical Report NWU-EECS-08-07, Northwestern University, Aug. 2010.

Notice of Allowance issued by the U.S. Patent Office on Jan. 9, 2013 in connection with related U.S. Appl. No. 12/813,859.

Office Action issued by the U.S. Patent Office on Jan. 10, 2013 in connection with related U.S. Appl. No. 12/969,682.

U.S. Appl. No. 13/779,851, filed Feb. 28, 2013, Polley et al.

International Preliminary Report on Patentability mailed by the International Bureau of WIPO on Jan. 10, 2013, in connection with corresponding PCT international application No. PCT/US2011/035874, which corresponds to related U.S. Appl. No. 12/820,227.

Office Action issued by the U.S. Patent Office on Feb. 8, 2013 in connection with related U.S. Appl. No. 13/046,127.

Notice of Allowance issued by the U.S. Patent Office on Mar. 14, 2013 in connection with related U.S. Appl. No. 12/230,338.

U.S. Appl. No. 10/843,374, filed May 2004, Roesch et al., System and Methods for Determining Characteristics of a Network Based on Flow Analysis.

(56) References Cited

OTHER PUBLICATIONS

U.S. Appl. No. 12/813,859, filed Jun. 2010, Polley et al., System and Method for Assigning Network Blocks to Sensors.
U.S. Appl. No. 12/820,227, filed Jun. 2010, Vogel III et al., System and Method for Resolving Operating System or Service Identity Conflicts.
U.S. Appl. No. 12/969,682, filed Dec. 2010, Roesch et al., Systems and Methods for Determining Characteristics of a Network and Enforcing Policy.
U.S. Appl. No. 13/046,127, filed Mar. 2011, Roesch, System and Method for Real Time Data Awareness.
Aho et al., "Efficient String Matching: An Aid to Bibliographic Search," *Communications from the ACM* (Jun. 1975), vol. 18, No. 6, pp. 333-340.
Tarjan, et al., "Storing a Sparse Table," Communications of the ACM (Nov. 1979), vol. 2, No. 11, pp. 606-620.
V. Jacobson, et al., Request for Comments: 1323, "TCP Extensions for High Performance," May 1992 (35 pages).
J. Howe, "An Environment for "Sniffing" DCE-RPC Traffic," CITI Technical Report 93-4, Jun. 21, 1993, 12 pages total.
T. Ptacek, et al., "Insertion, Evasion, and Denial of Service: Eluding Network Intrusion Detection", Jan. 1998, pp. 1-63.
R. Gula, "Passive Vulnerability Detection. *Techniques to passively find network security vulnerabilities*," Sep. 9, 1999 (5 pp).
N. Chase, "Active Server Pages 3.0 from Scratch" (Dec. 1999), Searching for products section, 13 pp.
L. Spitzner, "Passive Fingerprinting," *FOCUS on Intrusion Detection: Passive Fingerprinting* (May 3, 2000), pp. 1-4; obtained from: http://www.stillhq.com/pdfdb/000183/data.pdf.
N. Brownlee, et al., "Methodology for Passive Analysis of a University Internet Link," *PAM 2001 Passive and Active Measurement Workshop*, Apr. 2001 (7 pp.).
B. Krishnamurthy, "Web Protocols and Practice," (May 1, 2001), pp. 518-520.
G. Lyon, "Remote OS detection via TCP/IP Stack Fingerprinting"(Jun. 30, 2002), pp. 1-12, obtained from: http://web.archive.org/web20021017063625/www.insecure.org/nmap/nmap-fingerprinting-article.html.
U. Shankar and V. Paxson, *Active Mapping: Resisting NIDS Evasion Without Altering Traffic*, Proc. IEEE Symposium on Security and Privacy. May 2003, pp. 1-18.
D. Roelker, "HTTP IDS Evasions Revisited" (Aug. 1, 2003) [online] (retrieved on Nov. 9, 2006). Retrieved from the Internet <URL: http://docs.idsresearch.org/http_ids_evasions.pdf>.
R.P. Lippmann et al., "Passive Operating System Identification from TCP/IP Packet Headers," *Proceedings Workshop on Data Mining for Computer Security* (*DMSEC*), Nov. 2003 (10 pp.).
Norton et al., "Multi-Patten Search Engine Aho-Corasick State Machine" (Mar. 17, 2004), Version 2.0, 36 pp.
R. Hiyoshi, "Practical Guide to Intrusion Detection System: Snort & Tripwire," Japan, Apr. 25, 2004, pp. 57-230 (concise English explanation of relevance attached).
R. Deraison, et al., "Passive Vulnerability Scanning: Introduction to NeVO," *Tenable Network Security*, May 30, 2004, pp. 1-13.
Full Band and Matrix Algorithms (Jun. 9, 2004), http://web.archive.org/web20040109154658/http://www.netlib.org/utk/lsi/pcwLSI/text/node150.html.
M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.
R. Deraison, et al., "Nessus Network Auditing," *Sungress Publishing*, Jul. 20, 2004, pp. 1-13.
Norton et al., "Sourcefire Optimizing Pattern Matching for Intrusion Detection" (Sep. 2004), 14 pp.
J. Novak, "Target-Based Fragmentation Reassembly" (Apr. 2005), Revision 2.0, pp. 1-32.
S.Siddharth, "Evading NIDS, revisited" (Dec. 12, 2005).
"Snort™ Users Manual 2.6.0," *The Snort Project* (May 23, 2006), pp. 1-126.

"Toupper( )—convert lowercase character to uppercase," http://www.mkssoftware.com, printed on Sep. 20, 2008 from http://web.archive.org, archive date Jun. 30, 2006, 2 pp.
J. Novak et al., "Target-Based TCP Stream Reassembly" (Aug. 3, 2007), Revision 1.0, pp. 1-23, obtained from: http://www.snort/org/docs/stream5-model AUg032007.pdf.
"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.
D. Joseph, et al., "A Policy-aware Switching Layer for Data Centers," *SIGCOMM*, Aug. 17-22, 2008, pp. 51-62.
"Enhanced Operating System Identification with Nessus," *Tenable Network Security* (2007), obtained from: http://blog.tenablesecurity.com/2009/02/enhanced_operat.html, posted by R. Gula on Feb. 16, 2009 (3 pp. total).
Office Action issued by the U.S. Patent Office on Jul. 16, 2007 in connection with related U.S. Appl. No. 10/898,220.
Office Action issued by the U.S. Patent Office on Sep. 6, 2007 in connection with related U.S. Appl. No. 10/843,374.
Notice of Allowance issued by the U.S. Patent Office on Sep. 6, 2007 in connection with related U.S. Appl. No. 10/843,376.
Office Action issued by the U.S. Patent Office on Sep. 26, 2007 in connection with related U.S. Appl. No. 10/843,353.
Office Action issued by the U.S. Patent Office on Oct. 4, 2007 in connection with related U.S. Appl. No. 10/951,796.
Notice of Allowance issued by the U.S. Patent Office on Oct. 5, 2007 in connection with related U.S. Appl. No. 10/793,887.
International Search Report and Written Opinion of the International Searching Authority issued on Oct. 9, 2007 in connection with PCT application No. PCT/US06/43800, which corresponds to U.S. Appl. No. 11/272,034.
Office Action issued by the U.S. Patent Office on Nov. 21, 2007 in connection with related U.S. Appl. No. 10/843,398.
European Search Report issued by the European Patent Office on Nov. 22, 2007 in connection with European patent application No. 07014575.0-1244, which corresponds to related U.S. Appl. No. 11/493,934.
International Search Report and Written Opinion of the International Searching Authority issued on Dec. 5, 2007 in connection with PCT application No. PCT/US05/25583, which corresponds to U.S. Appl. No. 10/951,796.
European Search Report issued by the European Patent Office on Dec. 27, 2007 in connection with European patent application No. 07015003.2-2413, which corresponds to related U.S. Appl. No. 11/501,776.
Office Action issued by the U.S. Patent Office on Jan. 10, 2008 in connection with related U.S. Appl. No. 10/843,373.
Office Action issued by the U.S. Patent Office on Feb. 5, 2008 in connection with related U.S. Appl. No. 10/843,375.
Office Action issued by the U.S. Patent Office on Feb. 21, 2008 in connection with related U.S. Appl. No. 11/272,033.
Office Action issued by the U.S. Patent Office on Mar. 12, 2008 in connection with parent U.S. Appl. No. 10/843,459.
Office Action issued by the U.S. Patent Office on Mar. 20, 2008 in connection with related U.S. Appl. No. 10/843,374.
Final Office Action issued by the U.S. Patent Office on May 9, 2008 in connection with related U.S. Appl. No. 10/843,353.
International Preliminary Report on Patentability mailed on May 22, 2008 in connection with PCT application No. PCT/US06/43800, which corresponds to U.S. Appl. No. 11/272,034.
Final Office Action issued by the U.S. Patent Office on Jun. 4, 2008 in connection with related U.S. Appl. No. 10/843,398.
International Search Report and Written Opinion of the International Searching Authority issued on Jun. 19, 2008 in connection with PCT application No. PCT/US05/25584, which corresponds to U.S. Appl. No. 10/898,220.
Final Office Action issued by the U.S. Patent Office on Jun. 26, 2008 in connection with related U.S. Appl. No. 10/898,220.
International Search Report and Written Opinion of the International Searching Authority issued on Jun. 30, 2008 in connection with PCT application No. PCT/US07/21351, which corresponds to U.S. Appl. No. 11/905,980.

(56) References Cited

OTHER PUBLICATIONS

International Search Report and Written Opinion of the International Searching Authority issued on Jul. 2, 2008 in connection with PCT application No. PCT/US08/02454, which corresponds to U.S. Appl. No. 11/711,876.
International Search Report and Written Opinion of the International Searching Authority issued on Jul. 7, 2008 in connection with PCT application No. PCT/US06/43820, which corresponds to U.S. Appl. No. 11/272,035.
Office Action issued by the U.S. Patent Office on Jul. 11, 2008 in connection with related U.S. Appl. No. 11/272,034.
Final Office Action issued by the U.S. Patent Office on Jul. 17, 2008 in connection with parent U.S. Appl. No. 10/843,459.
Final Office Action issued by the U.S. Patent Office on Aug. 6, 2008 in connection with related U.S. Appl. No. 10/843,375.
Notice of Allowance issued by the U.S. Patent Office on Aug. 18, 2008 in connection with related application U.S. Appl. No. 11/272,033.
International Search Report and Written Opinion of the International Searching Authority issued on Aug. 18, 2008 in connection with PCT application No. PCT/US08/05466, which corresponds to U.S. Appl. No. 12/149,196.
Final Office Action issued by the U.S. Patent Office on Aug. 19, 2008 in connection with related U.S. Appl. No. 10/843,373.
Final Office Action issued by the U.S. Patent Office on Aug. 20, 2008 in connection with related U.S. Appl. No. 10/843,353.
Office Action issued by the U.S. Patent Office on Oct. 6, 2008 in connection with related U.S. Appl. No. 10/843,374.
Notice of Allowance issued by the U.S. Patent Office on Oct. 15, 2008 in connection with related U.S. Appl. No. 10/951,796.
Notice of Allowance issued by the U.S. Patent Office on Oct. 21, 2008 in connection with related U.S. Appl. No. 10/843,375.
European Office Action issued by the European Patent Office on Nov. 28, 2008 in connection with European patent application No. 07 015 003.2-2413, which corresponds to related U.S. Appl. No. 11/501,776.
Office Action issued by the U.S. Patent Office on Dec. 17, 2008 in connection with related U.S. Appl. No. 10/843,398.
Office Action issued by the U.S. Patent Office on Dec. 23, 2008 in connection with related U.S. Appl. No. 11/272,034.
Office Action issued by the U.S. Patent Office on Jan. 16, 2009 in connection with related U.S. Appl. No. 10/843,353.
Office Action issued by the U.S. Patent Office on Jan. 21, 2009 in connection with related U.S. Appl. No. 11/493,934.
Notice of Allowance issued by the U.S. Patent Office on Jan. 21, 2009 in connection with related U.S. Appl. No. 10/898,220.
Office Action issued by the U.S. Patent Office on Feb. 4, 2009 in connection with related U.S. Appl. No. 10/843,373.
Office Action issued by the U.S. Patent Office on Feb. 9, 2009 in connection with parent U.S. Appl. No. 10/843,459.
International Preliminary Report on Patentability and Written Opinion of the International Searching Authority mailed on Mar. 3, 2009 in connection with PCT application No. PCT/US05/025584, which corresponds to U.S. Appl. No. 10/898,220.
International Preliminary Report on Patentability and Written Opinion of the International Searching Authority mailed on Mar. 17, 2009 in connection with corresponding PCT application No. PCT/US06/43820, which corresponds to related U.S. Appl. No. 11/272,035.
International Preliminary Report on Patentability mailed on Apr. 7, 2009 in connection with PCT application no. PCT/US07/021351, which corresponds to U.S. Appl. No. 11/905,980.
Office Action issued by the U.S. Patent Office on Apr. 28, 2009 in connection with related U.S. Appl. No. 11/501,776.
Final Office Action issued by the U.S. Patent Office on May 13, 2009 in connection with related U.S. Appl. No. 10/843,374.
Office Action issued by the U.S. Patent Office on May 14, 2009 in connection with related U.S. Appl. No. 11/272,034.
International Search Report and Written Opinion of the International Searching Authority mailed on May 27, 2009 in connection with PCT application No. PCT/US09/02210, which corresponds to U.S. Appl. No. 12/230,338.
Office Action issued by the U.S. Patent Office on Jun. 1, 2009 in connection with related U.S. Appl. No. 11/272,035.
Notice of Allowance issued by the U.S. Patent Office on Jun. 11, 2009 in connection with related U.S. Appl. No. 10/843,373.
Office Action issued by the U.S. Patent Office on Jun. 23, 2009 in connection with related U.S. Appl. No. 11/785,609.
Office Action issued by the U.S. Patent Office on Jul. 6, 2009 in connection with parent U.S. Appl. No. 10/843,459.
Office Action issued by the U.S. Patent Office on Jul. 7, 2009 in connection with related U.S. Appl. No. 10/843,398.
Office Action issued by the U.S. Patent Office on Jul. 28, 2009 in connection with related U.S. Appl. No. 10/843,353.
Office Action issued by the U.S. Patent Office on Jul. 30, 2009 in connection with related U.S. Appl. No. 11/493,934.
Office Action issued by the U.S. Patent Office on Aug. 20, 2009 in connection with related U.S. Appl. No. 10/843,374.
International Preliminary Report on Patentability mailed on Sep. 11, 2009 in connection with PCT application No. PCT/US08/002454, which corresponds to U.S. Appl. No. 11/711,876.
Advisory Action issued by the U.S. Patent Office on Sep. 29, 2009 in connection with parent U.S. Appl. No. 10/843,459.
European Search Report issued by the European Patent Office on Oct. 12, 2009 in connection with European patent application No. 05773501.1-2201, which corresponds to related U.S. Appl. No. 10/898,220, U.S. Appl. No. 11/785,609 and U.S. Appl. No. 12/010,900.
Final Office Action issued by the U.S. Patent Office on Oct. 29, 2009 in connection with related U.S. Appl. No. 11/501,776.
International Preliminary Report on Patentability mailed on Nov. 12, 2009 in connection with PCT application No. PCT/US08/005466, which corresponds to U.S. Appl. No. 12/149,196.
Advisory Action issued by the U.S. Patent Office on Dec. 2, 2009 in connection with related U.S. Appl. No. 10/843,398.
Notice of Allowance issued by the U.S. Patent Office on Dec. 8, 2009 in connection with related U.S. Appl. No. 11/501,776.
Final Office Action issued by the U.S. Patent Office on Dec. 8, 2009 in connection with related U.S. Appl. No. 11/272,034.
Final Office Action issued by the U.S. Patent Office on Dec. 9, 2009 in connection with related U.S. Appl. No. 11/272,035.
Office Action issued by the U.S. Patent Office on Dec. 17, 2009 in connection with related U.S. Appl. No. 11/493,934.
Notice of Allowance issued by the U.S. Patent Office on Jan. 7, 2010 in connection with related U.S. Appl. No. 10/843,353.
Notice of Allowance issued by the U.S. Patent Office on Jan. 8, 2010 in connection with related U.S. Appl. No. 10/843,373.
Office Action issued by the European Patent Office on Jan. 15, 2010 in connection with European patent application No. 05773501.1-2201, which corresponds to related U.S. Appl. No. 10/898,220, U.S. Appl. No. 11/785,609 and U.S. Appl. No. 12/010,900.
Notice of Allowance issued by the U.S. Patent Office on Feb. 5, 2010 in connection with related U.S. Appl. No. 11/272,034.
Advisory Action issued by the U.S. Patent Office on Feb. 24, 2010 in connection with related U.S. Appl. No. 11/272,035.
Notice of Allowance issued by the U.S. Patent Office on Mar. 5, 2010 in connection with related U.S. Appl. No. 11/785,609.
International Search Report and Written Opinion of the International Searching Authority issued on Mar. 16, 2010 in connection with PCT application No. PCT/US09/59965, which corresponds to U.S. Appl. No. 12/575,612.
Office Action issued by the U.S. Patent Office on Mar. 16, 2010 in connection with related U.S. Appl. No. 11/272,035.
Final Office Action issued by the U.S. Patent Office on Mar. 17, 2010 in connection with related U.S. Appl. No. 10/843,374.
Office Action issued by the U.S. Patent Office on Mar. 22, 2010 in connection with related U.S. Appl. No. 11/493,934.
Office Action issued by the U.S. Patent Office on Apr. 7, 2010 in connection with related U.S. Appl. No. 11/711,876.
Office Action issued by the U.S. Patent Office on Apr. 15, 2010 in connection with related U.S. Appl. No. 12/010,900.

(56) References Cited

OTHER PUBLICATIONS

Office Action issued by the U.S. Patent Office on Apr. 21, 2010 in connection with parent U.S. Appl. No. 10/843,459.
Notice of Allowance issued by the U.S. Patent Office on May 24, 2010 in connection with related U.S. Appl. No. 10/843,398.
Advisory Action issued by the U.S. Patent Office on Aug. 3, 2010 in connection with related U.S. Appl. No. 10/843,374.
Final Office Action issued by the U.S. Patent Office on Sep. 8, 2010 in connection with parent U.S. Appl. No. 10/843,459.
Final Office Action issued by the U.S. Patent Office on Sep. 17, 2010 in connection with related U.S. Appl. No. 11/711,876.
Office Action mailed Sep. 7, 2010 from the Japan Patent Office for Japanese patent application No. 2007-523639 in connection with related U.S. Appl. No. 10/951,796, now U.S. patent No. 7,496,962 (English translation enclosed).
Final Office Action issued by the U.S. Patent Office on Sep. 30, 2010 in connection with related U.S. Appl. No. 11/493,934.
Notice of Allowance issued by the U.S. Patent Office on Oct. 5, 2010 in connection with related U.S. Appl. No. 10/843,374.
International Preliminary Report on Patentability mailed on Oct. 19, 2010 in connection with PCT application No. PCT/US2009/02210, which corresponds to U.S. Appl. No. 12/230,338.
Final Office Action issued by the U.S. Patent Office on Oct. 25, 2010 in connection with related U.S. Appl. No. 11/272,035.
Final Office Action issued by the U.S. Patent Office on Nov. 4, 2010 in connection with related U.S. Appl. No. 10/843,459.
Office Action issued by the U.S. Patent Office on Nov. 19, 2010 in connection with parent U.S. Appl. No. 10/843,459.
Final Office Action issued by the U.S. Patent Office on Nov. 24, 2010 in connection with related U.S. Appl. No. 12/010,900.
Office Action issued by the U.S. Patent Office on Dec. 22, 2010 in connection with related U.S. Appl. No. 11/905,908.
"Snort™ Users Manual 2.2.0RC1," *The Snort Project*, Jun. 28, 2004, Retrieved from the Internet: URL:http://cvs.snort.org/viewcvs.cgi/*checkout*/snort/doc/snort_manual.pdf?rev=1.25&content-type=application/pdf [retrieved on Nov. 18, 2010] (XP002610157).
V. Yegneswaran, et al., "Internet Sieve: An Architecture for Generating Resilient Signatures," May 2004, Retrieved from the Internet: URL:http://www.cc.gatech.edu/~giffin/papers/tr1507/tr1507.pdf [retrieved on Nov. 18, 2010] (XP002610154).
D. Roekler, "HTTP IDS Evasions Revisited," Jan. 8, 2003, Retrieved from the Internet: URL:http://docs.idsresearch.org/http_ids_evasions.pdf [Nov. 18, 2010] (XP002610155).
M. Norton, et al., "The New Snort," *Computer Security Journal*, CSI Security Institute, XIX, No. 3 (Jan. 1, 2003), pp. 37-47, ISSN: 0277-0865 (XP008039475).
European Search Report issued by the European Patent Office on Dec. 6, 2010 in connection with European patent application No. 05773540.9-2413, which corresponds to related U.S. Patent No. 7,496,962.
Notice of Allowance issued by the U.S. Patent Office on Jan. 24, 2011 in connection with related U.S. Appl. No. 10/843,459.
Notice of Allowance issued by the U.S. Patent Office on Feb. 24, 2011 in connection with related U.S. Appl. No. 11/493,934.
Press Release, "FaceTime Protects Enterprises from Information Leaks over Collaborative Suites like Microsoft OCS and IBM Sametime", issued by FaceTime Communications, Belmont, California, Jul. 14, 2008, retrieved from www.facetime.com/pr/pr080714.aspx, Dec. 1, 2009.
Office Action mailed Mar. 1, 2011 from the Japan Patent Office for Japanese patent application No. 2007-523640 in connection with related U.S. Appl. No. 10/898,220, now U.S. patent no. 7,539,681, U.S. Appl. No. 11/785,609, now U.S. patent No. 7,756,885, and U.S. Appl. No. 12/010,900 (English translation enclosed).
Office Action issued by the U.S. Patent Office on Apr. 6, 2011 in connection with related U.S. Appl. No. 11/711,876.
Office Action issued by the U.S. Patent Office on Apr. 13, 2011 in connection with related U.S. Appl. No. 12/230,338.
Office Action issued by the U.S. Patent Office on May 12, 2011 in connection with related U.S. Appl. No. 12/149,196.
Notice of Allowance issued by the U.S. Patent Office on Apr. 6, 2011 in connection with related U.S. Appl. No. 12/010,900.
PCT International Preliminary Report on Patentability mailed on Apr. 21, 2011 by the International Bureau of WIPO in connection with PCT patent application No. PCT/US2009/059965, which corresponds to U.S. Appl. No. 12/575,612.
Office Action issued by the U.S. Patent Office on May 31, 2011 in connection with related U.S. Appl. No. 12/688,400.
Notice of Allowance issued by the U.S. Patent Office on Jun. 22, 2011 in connection with related U.S. Appl. No. 11/272,035.
Notice of Allowance issued by the U.S. Patent Office on Jul. 22, 2011 in connection with related U.S. Appl. No. 11/711,876.
Extended European Search Report issued by the European Patent Office on Jul. 19, 2011 in connection with European patent application No. 06837333.1-2413, which corresponds to related U.S. Patent No. 7,733,803.
International Search Report and Written Opinion of the International Searching Authority issued on Jul. 28, 2011 in connection with PCT application No. PCT/US2011/032489, which corresponds to the present U.S. Appl. No. 13/086,819.
Matthew Olney et al.: "What would you do with a pointer and a size? A New Detection Framework", Apr. 22, 2010 (Apr. 2, 2010), XP55002567, http://labs.snort.org,/nrt/sfvrt-nrt.pdf (retrieved on Jul. 12, 2011) the whole document.
Final Office Action issued by the U.S. Patent Office on Dec. 9, 2011 in connection with related U.S. Appl. No. 12/688,400.
Office Action issued by the U.S. Patent Office on Feb. 2, 2012 in connection with related U.S. Appl. No. 12/688,400.
Office Action issued by the U.S. Patent Office on Feb. 15, 2012 in connection with related U.S. Appl. No. 12/820,227.
Office Action issued by the U.S. Patent Office on Feb. 15, 2012 in connection with related U.S. Appl. No. 12/230,338.
Office Action issued by the U.S. Patent Office on Mar. 5, 2012 in connection with related U.S. Appl. No. 12/968,682.
Office Action issued by the U.S. Patent Office on Mar. 19, 2012 in connection with related U.S. Appl. No. 12/813,859.
International Search Report and Written Opinion of the International Searching Authority issued on Apr. 25, 2012 in connection with PCT application No. PCT/US2012/021633, which corresponds to U.S. Appl. No. 13/046,127.
Final Office Action issued by the U.S. Patent Office on May 29, 2012 in connection with related U.S. Appl. No. 12/230,338.
Notice of Allowance issued by the U.S. Patent Office on May 30, 2012 in connection with related U.S. Appl. No. 12/575,612.
Final Office Action issued by the U.S. Patent Office on Jun. 5, 2012 in connection with related U.S. Appl. No. 12/813,859.
Auffret, Patrice. "SinFP, unification of active and passive operating system fingerprinting." Journal in Computer Virology 6.3 (2010): 197-205.
De Montigny-Leboef, Annie. "A multi-packet signature approach to passive operating system detection." Defense Technical Information Center, 2005.
Tu, William, et al. "Automated Service Discovery for Enterprise Network Management." Mar. 8, 2009.
Taleck, Greg. "Ambiguity Resolution via Passive OS Fingerprinting." Recent Advances in Intrusion Detection. Springer-Verlag Berlin Heidelberg, 2003.
Office Action issued by the European Patent Office on Mar. 20, 2013 in connection with European Patent Application No. 05773501.1-1952 which corresponds to related U.S. Appl. No. 10/898,220 (now patent No. 7,539,631).
Notice of Allowance issued by the Canadian Intellectual Property Office on Apr. 19, 2013 in connection with Canada Patent Application No. 2685292, which corresponds to related U.S. Appl. No. 12/820,227.
Final Office Action issued by the U.S. Patent Office on Apr. 18, 2013 in connection with related U.S. Appl. No. 12/969,682.
Office Action issued by the U.S. Patent Office on May 6, 2013 in connection with related U.S. Appl. No. 12/820,227.
Final Office Action issued by the U.S. Patent Office on Jun. 10, 2013 in connection with related U.S. Appl. No. 13/046,127.
U.S. Appl. No. 14/013,344, filed Aug. 29, 2013, Roesch.

(56) References Cited

OTHER PUBLICATIONS

Notice of Allowance issued by the U.S. Patent Office on Jul. 12, 2013 in connection with related U.S. Appl. No. 12/969,682.
Notice of Allowance issued by the U.S. Patent Office on Aug. 13, 2013 in connection with related U.S. Appl. No. 13/046,127.

International Preliminary Report on Patentability and Written Opinion of the International Searching Authority mailed on Sep. 26, 2013 in connection with PCT application No. PCT/US2012/021633, which corresponds to related U.S. Appl. No. 13/046,127.

* cited by examiner

FIG. 5

| UID | Global | Description |
|---|---|---|
| 005d5464-7a44-4907-af57-4db08a61e13c | 1 | PDF Document |
| ba9beb5f-0653-4b04-9552-3bfb634ca7fc | 1 | PE Executable |
| 2b797454-d367-4841-8c9c-a713d012b546 | 1 | JavaScript |
| 7ab45fff-7c73-412c-8b86-c07619c8fc7d | 1 | Adobe Flash |
| 4e72c8ec-ff88-4371-a0f0-dfe2b4c733dc | 1 | Suspected Shellcode |
| d147f215-128e-4746-a1e2-b6c978bb1869 | 1 | SMTP Mail Capture |
| 5d1a26c7-ffa2-4067-9af8-4ed9ee383805 | 1 | Web Visit Tracking |
| 00000000-0000-0000-0000-000000000000 | 1 | Any Data |

501, 503, 505, 507

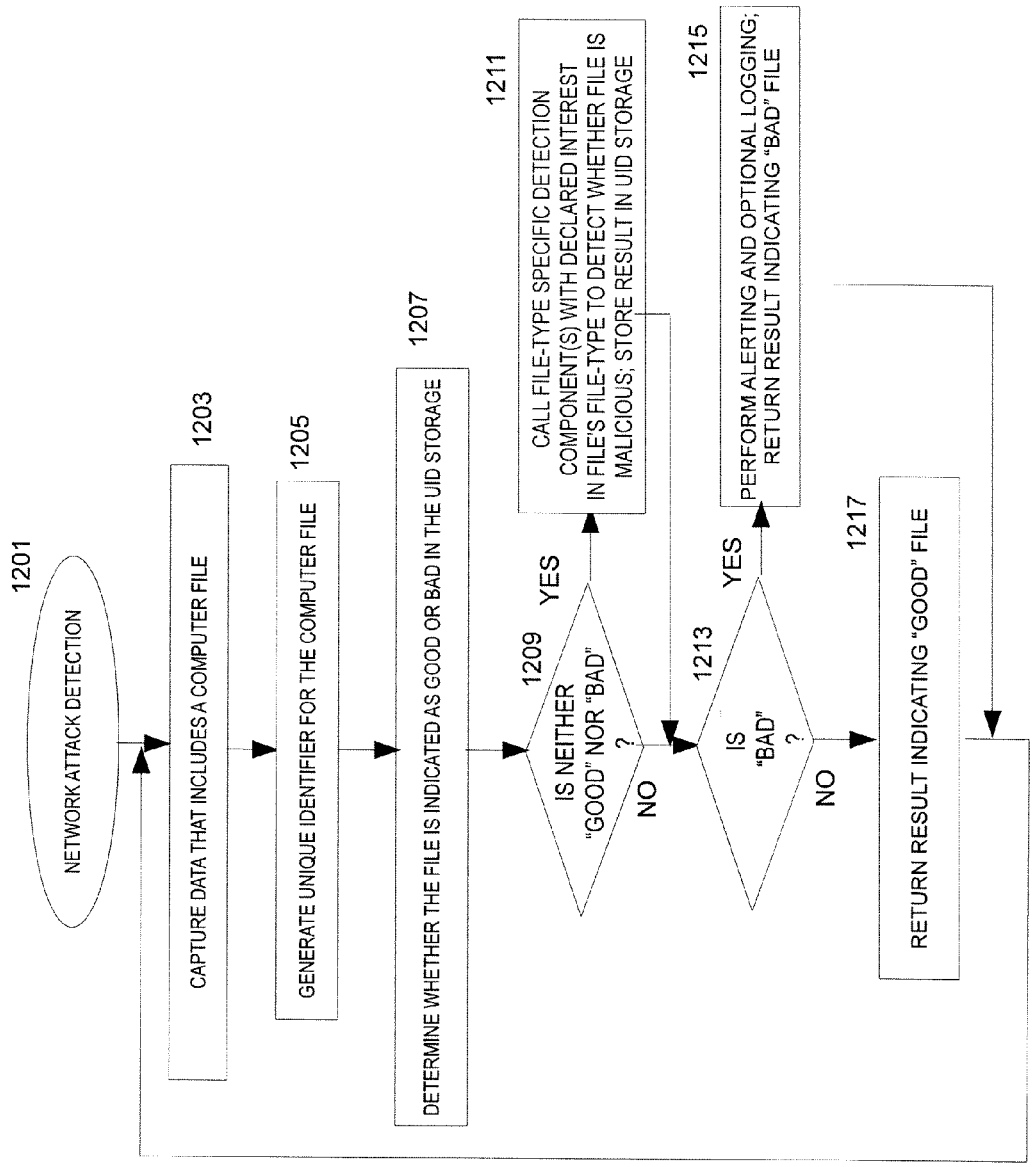

SYSTEM AND METHOD FOR NEAR-REAL TIME NETWORK ATTACK DETECTION, AND SYSTEM AND METHOD FOR UNIFIED DETECTION VIA DETECTION ROUTING

RELATED APPLICATIONS

This application claims priority to U.S. Provisional Patent Application No. 61/369,215 filed 30 Jul. 2010, and U.S. Provisional Patent Application No. 61/325,020 filed Apr. 16, 2010, all of which are expressly incorporated herein by reference.

TECHNICAL FIELD

The technical field relates in general to communication network management, and more specifically to determining characteristics of files on the communication network.

BACKGROUND

Traditionally the IDS space has attempted to detect attacks in a serial manner, as packets come in. Various technologies were introduced to provide for modeling of network communication behavior (fragmentation, TCP streaming, etc. . . . ). However, the focus has continued to be on speed of processing, in order to keep up with the packet stream.

This approach is difficult, if not impossible, to maintain if full detection on client-side attacks is desired. Because of the difficulties in processing file formats (offset tables, embedded files and backwards pointer references) and because of the extensive evasion capabilities available to attackers (loose interpretation of file format specifications, encryption, encoding, compression and scripting obfuscation) it is challenging to maintain detection. Add to that the necessity of modeling the behavior of thousands of clients and the requirement to operate at wire-speed becomes unrealistic.

Furthermore, vendor-specific implementation of data capture and data analysis systems typically do not provide for a mechanism to exchange data, each detection system is discrete, with a limited view of incoming data and no understanding if that data has been evaluated before. This approach fails to take advantage of the full investment made in detection technology and introduces an unnecessary amount of overhead to the system.

SUMMARY

Accordingly, one or more embodiments provide methods, systems, and/or computer readable memory mediums, in which a storage device is configured to store unique identifiers for data blocks and indications associated with the stored unique identifiers whether each of the data blocks is good or bad. Also, a processor device is configured to receive network traffic that includes a data block; generate a unique identifier for the data block as the data block is received in network traffic, the unique identifier including a hash value corresponding to the data block contents; determine during a packet scan operation on the network traffic of the packet that includes the data block whether the data block is indicated as good or bad in the unique identifier in the storage device; call a file-type specific detection nugget corresponding to a file-type of the data block to perform a full file inspection of the data block so as to detect whether the file is malicious, and store a result of the full file inspection indicating whether the file is good or bad together with the unique identifier of the data block in the storage device, when the data block is determined to be not indicated in the unique identifier in the storage device; not call the file-type specific detection nugget when the data block is determined to be indicated as good in the unique identifier in the storage device; and not call the file-type specific detection nugget when the data block is determined to be indicated as bad in the unique identifier in the storage device, and issue an alert indicating that the data block that was received is bad According to a variation, the file-type specific detection nugget is called by sending a notification to a dispatcher program that evaluation of the data block is desired, receiving a token from the dispatcher program authorizing inspection by the file-type specific detection nugget, and indicating the data block and the token authorizing inspection to the file-type specific detection nugget to commence full file inspection of the data block, wherein there are a plurality of file-type specific detection nuggets each for providing full file inspection of file contents of respective different file-types.

According to yet another variation, there also is a nugget storage that stores a plurality of file-type specific detection nuggets each configured to provide a file inspection of the data block in accordance with its respective different file type when a token authorizing inspection specific to the file-type specific detection nugget is received and when the token that is received is indicated as valid, to not provide a file inspection of the data block when the token that is received is not indicated as valid, and to not provide the file inspection of the data block when a file inspection is requested but the token is not received.

According to a further variation, the file-type specific detection nugget creates a unique identifier for a subcomponent of the data block when the subcomponent is found with a different file-type or obfuscation scheme than handled by the file-type specific detection nugget; calls a different file-type specific detection nugget corresponding to the different file-type of the subcomponent to inspect contents of the subcomponent or to look for the unique identifier of the subcomponent in the storage device so as to detect whether the subcomponent is bad or malicious; and stores a result of the subcomponent inspection indicating that the subcomponent is bad and that the data block is bad together with the unique identifier of both the subcomponent and the data block in the storage device, instead of storing the indicator that the data block is good with the unique identifier of the data block in the storage device, when the inspection result of the subcomponent that is found is returned as bad or malicious.

In yet another variation, the processor device marks the unique identifier for the data block stored in the storage device with a good indicator as "tainted", when a new detection capability is added to the file-type specific detection nugget; and the processor device treats the data block as not being indicated in the computer storage device instead of being indicated as "good" so that the good status of the data block is verified and the "tainted" indicated is replaced after the new detection capability is added, when the data block is indicated as "tainted".

In yet still another variation, the file-type specific detection nugget is configured to perform full file parsing that targets specific pre-determined attack triggering conditions.

In still another variation, the processor is further configured to provide retroactive alerting based on full file and subcomponent processing.

In yet another variation, the unique identifiers stored in the storage device are obtained by a cryptographic hash calculation from full file contents for the different data blocks as each of the data blocks is received in the network traffic.

In a further variation, the alert is issued to an anti-virus system attached to a mail-gateway for handling the network traffic received over the mail-gateway that contains the data block that is bad.

In yet another variation, the unique identifiers stored in the storage device are further indicated as "global" when they are unique to all system users, and not marked as "global" when they are unique to an individual and not unique to all system users.

In still another variation, the processor device is further configured to receive a declaration of interest in one or more file-types including the file-type from one or more file-type specific detection nuggets; and call all of the one or more file-type specific detection nuggets that declared interest in the file-type of the data block so that each of the one or more file-type specific detection nuggets that declared interest in the file-type of the data block can inspect the data block and return a result of its own file inspection, when the data block is determined to be not indicated in the unique identifier in the storage device.

Still other embodiments provide methods, systems, and/or computer readable memory mediums, in which a storage device is configured to store unique identifiers for data blocks and indications associated with the stored unique identifiers whether each of the data blocks is good or bad. Also, a processor device is configured to capture data that includes a data block; generate a unique identifier for the data block, the unique identifier including a hash value corresponding to the data block; receive a declaration of interest in one or more file-types including a file-type of the data block from one or more file-type specific detection nuggets; determine whether the data block is indicated as good or bad in the unique identifier in the storage device; call all of the one-or more file-type specific detection nugget that declared interest in the file-type of the data block so that each of the one or more file-type specific detection nuggets that declared interest in the file-type of the data block will perform inspect the data block so as to detect whether the file is malicious and each return a result of its own file inspection, and store the result of the full file inspection indicating whether the file is good or bad together with the unique identifier of the data block in the storage device, when the data block is determined to be not indicated in the unique identifier in the storage device; not call any of the one or more file-type specific detection nuggets when the data block is determined to be indicated as good in the unique identifier in the storage device; and not call any of the one or more file-type specific detection nuggets when the data block is determined to be indicated as bad in the unique identifier in the storage device, and issue an alert indicating that the data block that was received is bad.

In still other embodiments, there is provided one or more methods to perform the above.

In other embodiments, there is provided an apparatus configured to perform one or more of the methods.

In yet another embodiment, there is provided a computer readable medium, which is defined to be non-transitory, that comprises executable instructions for performing one or more of the methods.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

FIG. 5 is a block diagram illustrating a detection routing table;

FIG. 6 is a block diagram illustrating portions of an exemplary computer system;

FIG. 12 is a flow chart illustrating a process for network attack detection.

DETAILED DESCRIPTION

Figure 1:
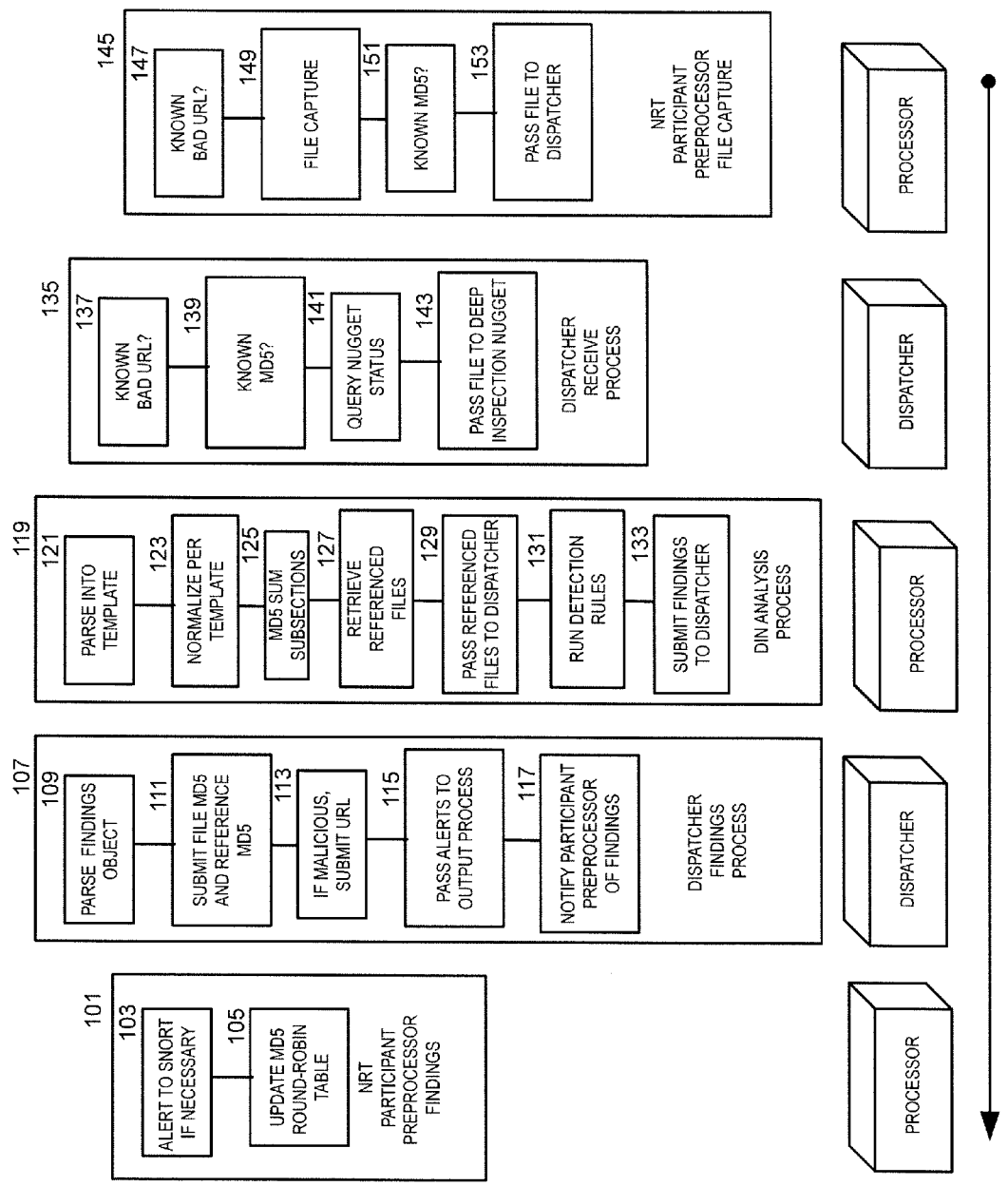
FIG. 1 is a diagram illustrating a high level architecture associated with near real-time (NRT) network attack detection.

In overview, the present disclosure concerns analysis of files, sometimes as transmitted on communication networks, often referred to as packet switching networks, which support communication between a source and a destination. Packets on such communication networks may carry information concerning files. More particularly, various inventive concepts and principles are embodied in systems, devices, and methods therein for evaluating a file that is detected in network traffic, or that is otherwise provided, so as to provide real time detection of threats. Also, various inventive concepts and principles are embodied in systems, devices and methods therein to manage the capture of data of specific types at remote locations on a network and to route that data to arbitrary detection systems.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Relational terms such as first and second, and the like, if any, are used herein solely to distinguish one from another entity, item, or action without necessarily requiring or implying any actual such relationship or order between such entities, items or actions. Some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Further in accordance with exemplary embodiments, an existing network intrusion system can be used to reassemble the file from network traffic while allowing continued standard IDS/IPS functionality. The system can evaluate the file and associated metadata against a set of known good/known bad data and, if that information does not determine the level of threat from the file, pass the file to a dispatch system that then manages distribution to a multi-node external detection system. The dispatch system then manages the feedback from the detection system, provides alerting and logging as desired and then provides feedback into existing IDS/AV/traffic filtering systems to update real-time detection.

Further in accordance with other exemplary embodiments, the system can provide a mechanism that separates the traditional model binding together data capture and data analysis. In doing so, the system can organize detection capability into an array of capability and allow for each entity in the array to declare an interest in one or more data types. The data collection points then tag captured data as being of a particular type. Finally, a central routing system routes that data to interested detection components based on the provided data tag.

A potential parallel to network-based IDS systems may be made, but there are no known systems that do full file processing. They typically work on signatures provided by vendors. This system introduces a framework for extensible detection and, unlike the traditional AV approach, targets the attack triggering conditions and not just a signature of known attacks.

VCP, Vector Content Protocol, is mentioned as another technology for managing content over networks. There are potential parallels to heuristics-based AV (anti-virus).

Before discussing three different embodiments of detailed architectures for the near real-time attack detection system and method (FIG. 2 to FIG. 4), an example of a high-level architecture illustrated in FIG. 1 will be described.

Reference is made to FIG. 1, a diagram illustrating a high level architecture associated with near real-time (NRT) network attack detection. The Dispatcher is the central service that can be running at startup. On initialization, the Dispatcher will process the Data Leak Prevention (DLP) data file and insert the filenames and a unique identifier (UID) into the database. Per configuration, it may also deploy signatures (see below) to real time systems to assist in detection and blocking of possible data-leak events.

The Snort IDS (available from Sourcefire) is discussed below as an example of an IDS. However, another IDS/IPS may be used as a base.

Participating Snort IDS sensors will activate a preprocessor 145 that will capture metadata as desired for evaluation and alerting: source data (URL/sendmail headers/FTP IP), file size and file name. Based on this information and user configuration, the preprocessor will decide if the file is "interesting". If it is, then the system begins to pull the file 149 from the network stream.

As the file is being pulled, the source data is compared against a local cache to evaluate if the source is a known-malicious site 147. If there is no entry on the local cache, a query to a centralized database is made to make the same check 137. If it is in the list of known-malicious site, the Snort IDS is instructed to alert and block future traffic (if configured) 103 and the Dispatcher system is notified of an alert. If Snort is not in an IPS configuration or the source information was not on any known-malicious list the file is captured in full 149 and detection continues.

Once the file is pulled in full, a UID for the file is made. A query against a local cache is made for known-bad UIDs and known-good UIDs 151. If there is no entry on the local cache, the same queries are made to a centralized database that holds all determined known-good and known-bad checksums 139. If the file is determined to be known-good, detection ceases, if the file matches a known-bad UID, then alerting is made both to Snort and to the Dispatcher.

In the case where the file does not match any known UID, detection continues. A notification 153 is sent to the Dispatcher that evaluation of a file is desired. The request includes the file type, file name and UID. The Dispatcher returns the location of a Deep Inspection Nugget (DIN) 141 that can handle that file type and a token that provides authorization to send the file. The Dispatcher also notifies the DIN that the token is valid.

The preprocessor then contacts the DIN and provides the token as authorization to transmit the file. The file is then provided 143 to the DIN 119 and full file inspection begins.

The DIN 119 that receives the file initially is specifically created to handle that file type. The DIN parses the file 121 into its atomic components which are determined by the file specification 123. The DIN then proceeds with detection of attacks or attack indicators that are specific to that file type 131. If the file, based on this initial processing is found to be malicious, the DIN sends a notification to the Dispatcher 133 of the reasons that the file was determined to be malicious, metadata that will assist Incident Response teams and a full copy of the file. If the file is determined to be non-malicious, then notification is sent to the Dispatcher 133 to update the list of known-good UIDs.

If, during the course of parsing, the DIN finds additional file types or obfuscation schemes that require separate parsing, the DIN creates a UID of the portion of the file (subcomponent) that requires additional processing. It then queries a local cache of known-bad/known good sub-component UIDs 125. If there is no entry in the local cache, then the same query is made to a centralized database. If the subcomponent is determined to be bad, then the DIN provides alert notification to the Dispatcher 129. If the UID is determined to be good, the DIN disregards that subcomponent and continues processing.

If the UID is unknown, then the DIN sends a request to the Dispatcher for additional processing. The Dispatcher returns the location of a DIN specializing in that file type or obfuscation scheme and a token that provides authorization to send the subcomponent data to the new DIN. The Dispatcher also notifies the new DIN that the token is valid.

The DIN then passes the subcomponent to the new DIN. The DIN processes the subcomponent just as it would if it were a file. If desired, the DIN can request additional processing if another subcomponent is found that requires evaluation. If the subcomponent is determined to be good, the DIN notifies the Dispatcher that the UID is good. If it is malicious, the DIN notifies the Dispatcher and provides the subcomponent in full. The DIN then updates its local cache. The original DIN is notified to updates its cache as well.

In addition to exploit detection DINs, a data-leak prevention (DLP) nugget is available for querying parsed text data from various document types. This processor will examine data blocks with pattern recognition and UIDS of data blocks in order to detect possible DLP events.

This process continues until file parsing is complete.

The Dispatcher 107 can be aware at all times of outstanding requests for file and subcomponent parsing requests 109. If, during processing it is notified that the file is malicious the Dispatcher can provide alerting 115 back to the source Snort sensor and mark the file and, if desired, the subcomponent UIDs as known-bad 111. It can continue to provide additional alerting 117 to the source sensor 101 as additional information is received from the various DINs involved in the file parsing. If, after all tokens are handled, there are no malicious indications, the UID of the file is marked as known-bad 105.

On files that are marked as malicious 113, once all tokens are handled, an enhanced set of reporting 115 can be made by the Dispatcher outside of the standard logging in Snort. This additional logging provides fully decompressed and normalized representations of the areas of the file or subcomponent that were determined to be malicious. Additionally, the file and, if desired, the subcomponent can be written in full to disk for forensic evaluation.

Because the UIDs for known-good files, along with the associated metadata are stored, and because each subsequent access to the UID from other sources is stored, the system can alert even after files have been marked good. Whenever there is a detection update in any portion of the system, all known-good entries can be marked as "tainted". If the file is seen again, the Dispatcher responds negatively to a UID check, because the status of the file is unverified after new detection capability is added. The file is then processed by the system.

If the file being rechecked is found to be good, the taint flag on the UID entry is removed and future DB queries will be responded to as known-good. If, however, the file is found to be bad the system alerts and logs normally. In addition, it alerts for each other system that is noted in the DB as having received the file. In this way as detection evolves, the system can be used to retroactively notify response teams of potential attacks and the desirability of remediation.

Because the system also manages subcomponents, alerting can occur on other files as well. If, for example, the system determines that a particular image file is malicious, and has detected that file in other kinds of documents, all associated documents are marked as malicious 127 and alerting occurs for all hosts that accessed any document that contained the malicious file 129.

The system for updates is extensible so other systems that want to piggy-back on the NRT (near real time) detection can make use of an API. For example, Snort sensors can be configured as NRT-Client only and only manage a local cache and queries to a centralized DB for known-bad source information. In this way administrators can choose to not incur the overhead of pulling files, but can still alert on URL, mail headers, and the like. Also, both Snort and ClamAV (as an example IDS or IPS) can accept custom created rules by the dispatcher that they can then use for real-time detection of events, so that blocking can occur prior to delivery of exploit on subsequent files. This functionality can be set to be delivered based on the severity of the alerts to the NRT system (for example, Notification/Suspicious/Exploit Indication/Known Attack).

The nugget system is also extensible, in that it provides a unified structure of metadata and a simple pointer/size to the file data. Detection systems will simply have to manage receiving the structure and data and determine if they wish to participate in subcomponent processing. An API to register as a nugget can be provided that indicates the type of component a detection engine is capable of inspecting. When multiple, non-overlapping detection is available for a particular file type (multiple AV systems, for example) a unique detection-type flag is set so that the dispatcher knows that the file needs to be sent to more than one DIN type.

While the Snort IDS system was specifically used for the proof-of-concept, any system capable of using the API to query the Dispatcher and deliver files to the DIN farm can participate in this system. This would not be limited to network-based systems. Any system capable of finding data in a format the system can use can participate in the system through API calls.

By way of example, a forensics system could submit to the system a suspicious file for initial evaluation. A network forensics system could capture file and provide them to the system independent of Snort for evaluation. Use of the APIs for submission, transmission and alert handling may be all that are required.

Figure 2:
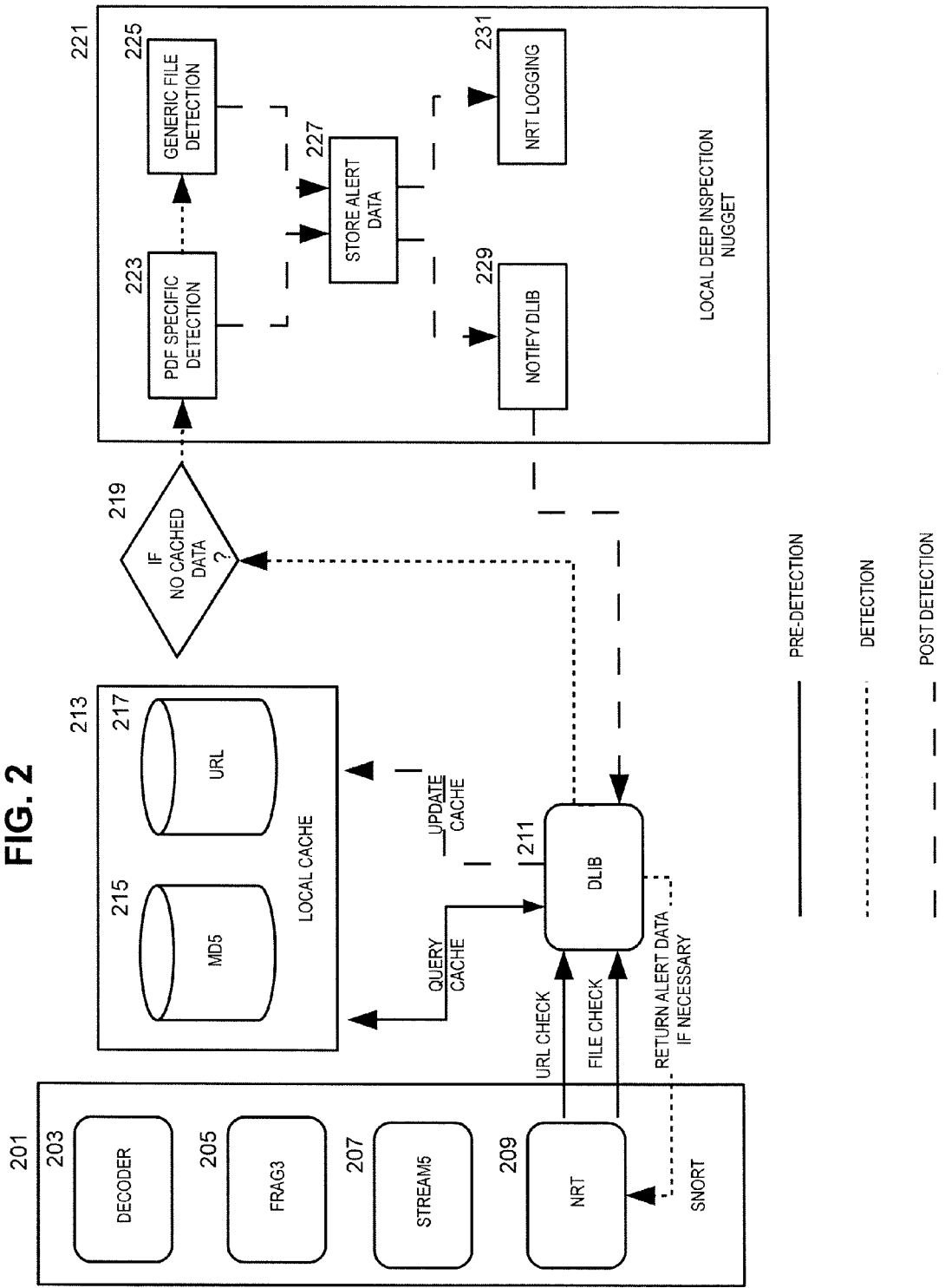
FIG. 2 is a functional flow diagram illustrating an architecture for NRT Phase One POC.

The following enumerated sections provide details of three different example embodiments using Snort IDS system for proof of concept (POC). In the following sections, reference is made to FIG. 2, FIG. 3 and FIG. 4, which are respectively functional flow diagram illustrating an architecture proposed to be implemented for NRT Phase One POC, NRT Phase Two POC, and NRT Phase Three. FIG. 2 illustrates a first embodiment, FIG. 3 adds a dispatcher and related flow and functionality not present in FIG. 2, and FIG. 4 is a variant of FIG. 3 with some additional flow and functionality for optimization.

1. Table of Contents
2. Overview
2.1 Summary
2.2 Scope
2.3 Assumptions & Assertions
2.3.1 Assumption
2.3.2 Assertion
2.4 General Requirements
2.4.1 NRT Snort Preprocessor
2.4.2 NRT DLIB Process
2.4.3 NRT Dispatcher
2.4.4 Deep Inspection Nugget
3. Use Cases
3.1 Single Server Installation
3.2 Multiple Server Installation
4. Concept of Operations
4.1 Configuration
4.2 Snort Integration Alerting
4.3 NRT Specific Alerting
5. Functional Design
5.1 POC Design
5.2 Alternative Embodiments -continued 6. Implementation Issues
6.1 Templating Language
6.2 Snort Integration
6.3 Rules Language
7. Test Cases
7.1 POC Phase One
7.2 POC Phase Two
8. Automated Testing 2. Overview The Near Real-Time Detection (NRT) is the result of extensive research by various members of the Vulnerability Research Team into the difficulty of providing detection against file format attacks using the Snort detection engine. The level of sophistication currently demonstrated both by actors described as the "Advanced Persistent Threat" (APT) and publically available exploit frameworks such as Metasploit, CANVAS and Core Impact leaves the VRT with few options to provide detection.

Complicating this difficulty is the desire of customers to have low-latency analysis at wire speed. Because of the processing necessary to address ascii hex decoding, JavaScript obfuscation, PDF object deflation and the myriad of other techniques available to attackers the system simply does not have the time available to normalize a document to the point that the system can analyze the document for malicious data.

NRT addresses this issue by pulling selected file types from the wire and passing them to additional detection engines either on the local box or on remote boxes. These detection engines are managed by a dispatcher process that handles their availability as well as the type of files handled by the detection engine. These engines then provide alerting information back to Snort for alerting through the traditional Snort process and also provide an alerting system specific to the NRT system that allows for larger blocks of data and information to be provided to the end-user.

2.1 Summary

This outlines the anticipated system architecture, use cases and design goals for the NRT system.

2.2 Scope

The NRT is initially implemented for the following file types and components:

BIFF Office Documents (Possible POC Phase 3)
X-class Office Documents (Possible POC Phase 3)
PDF Documents (POC Phase 1)
SWF Documents (Possible POC Phase 3)
PE Executable Files (Possible POC Phase 2)
HTML Documents (Possible POC Phase 3)
JavaScript (Possible POC Phase 3)
VBScript (Possible POC Phase 3)
Initial implementation will address:
NRT Snort Preprocessor
Participant Sensors (Those that actively supply files)
Client Sensors (Those that query the MD5 database) (Possible POC Phase 3)
Deep Inspection Nuggets
NRT Dispatcher (POC Phase 2)

2.3 Assumptions & Assertions 2.3.1 Assumption

The NRT system assumes that customers will tolerate a delay in alerting and a lack of active blocking (IPS) in exchange for a much more robust detection system for challenging, file-based detection issues.

2.3.2 Assertion

Assertion (n): positive statement or declaration, often without support or reason. Not applicable.

2.4 General Requirements 2.4.1 NRT Snort Preprocessor

Reference is made to FIG. 2, for example, illustrating an intrusion detection/prevention (IDS/IPS) processor 201, for example an available Snort system. In this example, the IDS/IPS 201 includes functionality for a decoder 203, FRAG3 205, and Stream5 207, all of which are known and readily available for evaluating traffic on the wire; and a near real-time preprocessor 209. The Snort preprocessor 209 is tasked with pulling and handling selected file types from the wire. Initially the preprocessor 209 will pull files from email and http traffic only. Once the file is successfully pulled from the wire the preprocessor will:

Pass a query with the appropriate metadata (URL/SMTP) to the DLIB process 211 to check the local cache 213, 217.

Failing that, calculate and pass the MD5 along with a pointer to the file in memory to the DLIB process 211.

Mark the stream as do-not-process to Snort, so that the stream does not take unnecessary resources from Snort.

The Preprocessor 209 will receive information from the dispatcher (e.g., FIG. 3, 333) on the results of the analysis and alert to Snort and make entries into the MD5 table 215 as necessary.

The design goal of the NRT Snort Preprocessor is to be minimally intrusive to Snort. As soon as additional detection is mandated, the data is passed outside of the Snort process, with only a thread held open to handle the return data.

2.4.2 NRT DLIB Process

The DLIB process (illustrated in FIG. 2, FIG. 3 and FIG. 4) 211, 317, 417 is the intermediary between the preprocessor 209, 309, 409 and the rest of the NRT system. The DLIB process 211, 317, 417 maintains the local caches 213, 311, 411 of URL 217, 315, 415 and MD5 sum data 215, 313, 413 and manages the tokens to distribute files to the various DINs 221, 319, 419. Specifically, the DLIB process will:

Check the Known-Bad URL 217, 315, 415 in the case of http file requests and block return traffic if there is an entry. Alert to Snort and notify the dispatcher of the alert.

Check the file MD5 sum against a set of MD5s 215, 313, 413 representing previously analyzed files. If the MD5 matches, return the data to the preprocessor to pass to Snort as an alert, and notify the Dispatcher of the alert.

Figure 3:
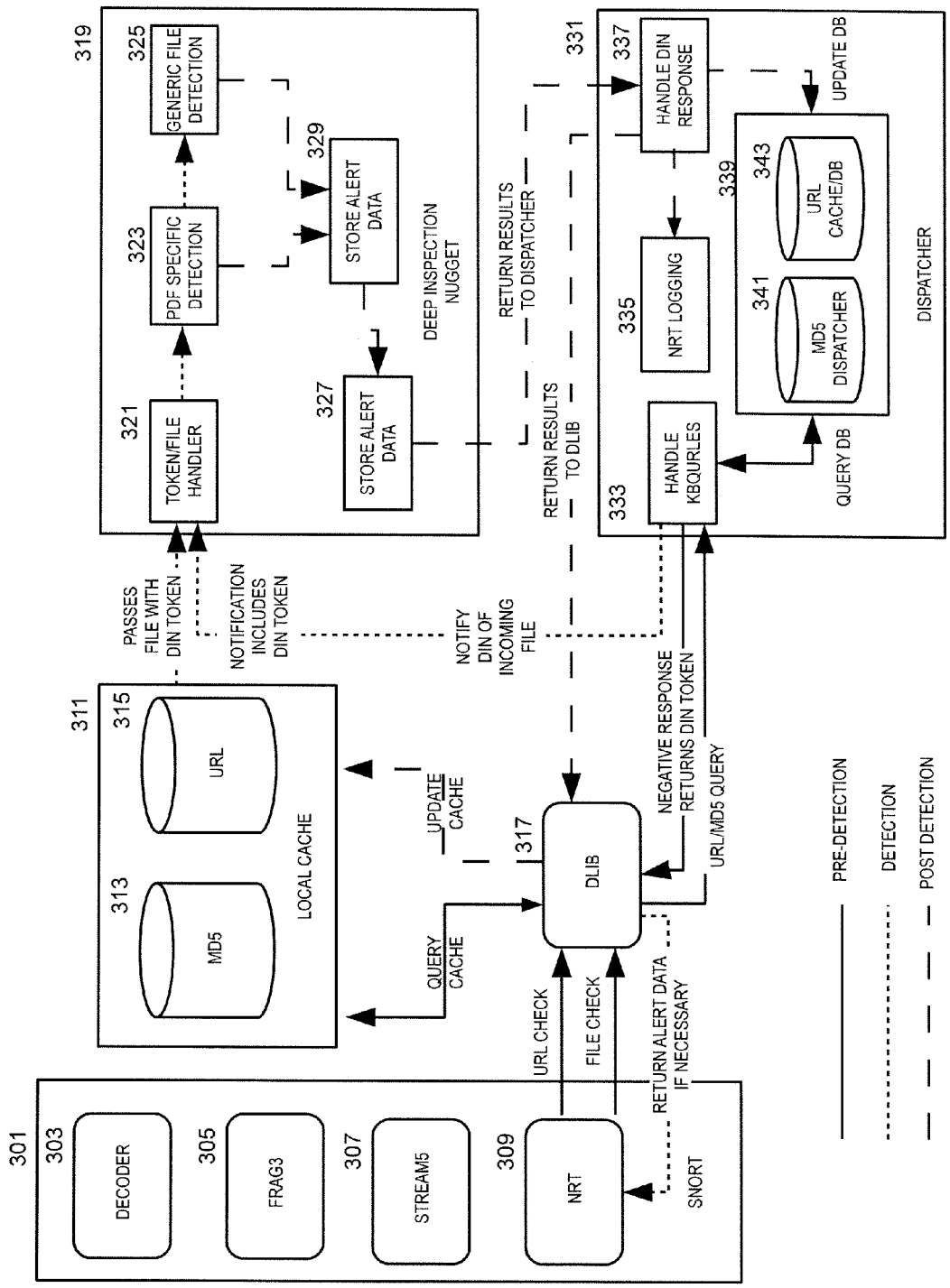
FIG. 3 is a functional flow diagram illustrating an architecture for NRT Phase Two POC.
Figure 4:
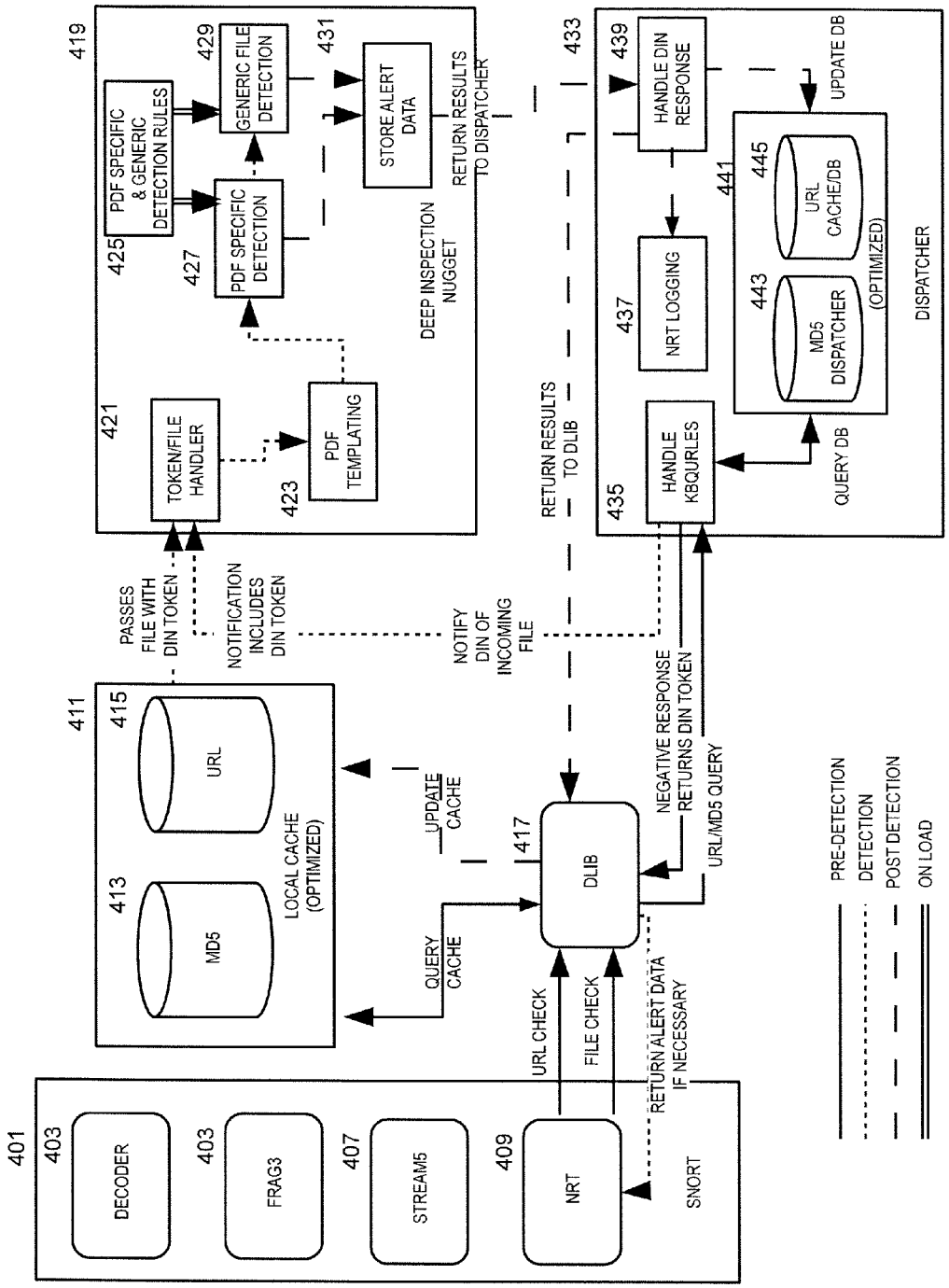
FIG. 4 is a functional flow diagram illustrating an architecture for NRT Phase Three that is optimized.

(Reference is made to FIG. 3 and FIG. 5.) Query the MD5 and URL databases 341, 343, 443, 445 (collectively, dispatcher database 339, 441) on the dispatcher 331, 433. If the dispatcher has an entry in the database 339, 441 it will return sufficient information to allow the DLIB process 317, 417 to notify the preprocessor 309, 409 to alert or terminate detection as necessary. The dispatcher will enter into the database any alerting (NRT logging 335, 437).

Failing the MD5 checks, the DLIB process will receive a token containing instructions to pass the file to a particular DIN.

Once the file has been passed to a DIN, the DLIB process will wait for results passed via the Dispatcher. Once the DLIB process receives this information, it updates the local cache entries 213, 311, 411 and passes the alert information back to the NRT preprocessor Sensors can be configured to use the NRT system in two different ways. Sensors that actively provide files into the NRT system are known as "participant sensors". Client sensors will maintain a local cache of known bad URLs and MD5 sums and will contact the Dispatcher to query the central database in the case of a cache failure. They will not, however, pass files into the NRT system for analysis.

2.4.3 NRT Dispatcher

The NRT Dispatcher 331, 433 (illustrated in FIG. 3, FIG. 4) is the process that manages the NRT system. It is responsible for passing files between the sensors and the Deep Inspection Nuggets (DIN) (here represented by one DIN 221, 319, 419), maintaining the MD5 and URL databases 341, 343, 443, 445, providing NRT specific alerting 335, 437 and passing component pieces of normalized data between DINs. Specifically the NRT dispatcher 331, 433 will:

Respond 333, 435 to queries from client sensors.

For failed queries, pass an authorization token to the sensor so the sensor can transfer a file to a DIN 319, 419.

Maintain a database 341, 443 of the MD5 sums of previously analyzed files and file subcomponents and the results of that analysis.

Make available an import function for known bad and known good MD5s.

Maintain a list of DINs in the Nugget Farm. This list will include a per-DIN list of available detection threads, the file specialization of the DIN and a metric of prior performance of the DIN.

The Dispatcher will request a DIN be reallocated to a different file specialization based on seen-file metrics.

The Dispatcher will provide information back to participant sensors so that the NRT preprocessor can alert and update the Known-Bad URL list if necessary and update the local MD5 list.

The Dispatcher will handle the custom alerting functionality 335, 437 of the NRT system.

2.4.4 Deep Inspection Nugget

The Deep Inspection Nuggets (illustrated in FIG. 2, FIG. 3, FIG. 4) 221, 319, 419 are the individual processes that handle the actual detection. Each DIN process is dedicated to a specific different file-type or component type. Each DIN will have a copy of the templating language file describing the file type as well as the detection set for the file type. The DIN process will then register with the Dispatcher and await an inbound file. Upon receiving 321, 421 a file the DIN will:

Parse the file using the supplied template 223, 321, 423.

Normalize subsections of the file as necessary 223, 321, 423.

If an embedded file or component is discovered during parsing that is handled by the Nugget Farm, that file or component will be passed back to the Dispatcher for further processing.

Apply 223, 323, 427, the file-specific detection ruleset 425 against the normalized data.

Apply generic search and XOR operations 225, 325, 429 against the normalized data.

Return findings 227, 229, 231, 327, 329, 431 e.g. to the Dispatcher 337, 439.

3. Use Cases

Two use cases are discussed, a single server installation of the Snort/NRT system and a larger installation consisting of dedicated participant and client sensors and a set of servers collected into the Nugget Farm.

3.1 Single Server Installation

The single server installation will most likely be the common installation for open source users. This installation would consist of a single Snort process acting as a participant server and separate processes for the Dispatcher and the individual DINs of the Nugget Farm. Files would be passed by mapping shared memory spaces and passing pointers to that space from the sensor process to the Dispatcher and from the Dispatcher to the appropriate DIN.

This installation would be appropriate for smaller organizations, remote offices or those security operations group with constrained budgets.

3.2 Multiple Server Installation

Multiple server installations can be used by organizations that desire a deep inspection of supported file types against a large pipe or want to cover several smaller pipes with a centralized Nugget Farm. In this case the Dispatcher and Deep Inspection Nugget processes are on one or more separate servers. Additionally the supporting database for the Dispatcher functionality may also exist on a separate server.

In these cases the operation is complicated only by the need to transfer information between the servers over the network as opposed to inter-process communications. Customers would be advised that the appropriate setup for this would be a private, non-routed network to provide a small increase in the security of the NRT system. Alerting would be passed to the individual Snort sensors as appropriate and the Dispatcher would handle the additional reporting of the NRT system.

4. Concept of Operations

Configuration, NRT specific alerting and Snort integrated alerting can be a primary means by which the users will integrate with the system.

4.1 Configuration

There are three places where configuration can occur:

(1) NRT Preprocessor

Define the following:

Role of preprocessor [client, participant]
IP of dispatcher
File types to pull
Maximum size of local URL list
Maximum size of local MD5 list (2) Dispatcher Define the following:

Database location
Nugget Farm IP addresses
Maximum size of URL list cache
Maximum size of MD5 list cache (3) Deep Inspection Nugget Define Dispatcher IP address Also, can define:

Max number of threads
Supported File Types

4.2 Snort Integrated Alerting

The Snort integrated alerting is designed to be fully compatible with current Snort alerting methods. The Dispatcher will decide, as part of the return process, what data should be included in the alert, possibly including passing normalized data back in the form of packet data. See open issues 6.2 for additional information.

4.3 NRT Specific Alerting

The NRT system can implement an alerting system that will allow a complete report on malicious files. This can include the normalized section of the file (in its entirety) that triggered an alert. For example, if a deflated JavaScript section triggered an alert, the inflated, deobfuscated script can be passed in the alert block.

5. Functional Design

Here is a summary of what can appear in a functional design section.

5.1 POC Design

System architecture has been described in section 2. For additional information, consult the NRT-POC-PHASES document (FIG. 2 to FIG. 4) that diagrams out the system in each of the three POC phases.

5.2 Alternative Embodiments

Alternative embodiments can implement one or more of the following:

Quarantine process

Pushing MD5 data to sensors

Reallocating DINs in the Nugget Farm to reflect statistical analysis of received files.

6. Implementation Issues

Implementation issues include:

6.1 Templating Language

The templating language can be more easily addressed by a scripting language rather than by C.

6.2 Snort Integration

An ideal system would provide back as much information as possible, but there may be practical limitations to preprocessor alerting in Snort.

6.3 Rules Language

Some of the Snort rules language can be modified/ported into the NRT system, as will be understood by those familiar with the Snort rules language. However, a new language with file format specific verbs can be created to support the NRT system.

7. Test Cases

The following test cases provide a general overview of expected results:

7.1 POC Phase One

Description:

PDF HTTP capture with local analysis and alerting (see FIG. 2 for POC Phase One)

Procedure—in the following order (1) In Snort 201, capture a malicious PDF in a live HTTP data stream.

Pass that PDF to a local DLIB 211.

DLIB fails the cache check 219 and passes the PDF to a local DIN 221.

Handle alerting 229, 231.

(2) In Snort 201, capture the same malicious PDF again via the same URL in a live HTTP data stream.

Pass that URL to a local DLIB 211.

DLIB returns an alert based on the URL cache entry 217.

(3) In Snort 201, capture the same malicious PDF again via a different URL in a live HTTP data stream.

Pass the PDF to a local DLIB 211.

DLIB alerts due to MD5 cache entry 215.

Expected Result

The file should alert three times. Once from the initial analysis, once for the URL cache and once via the MD5 cache.

7.2 POC Phase Two

Description:

PDF HTTP capture with remote analysis and alerting (see FIG. 3 for POC Phase Two)

Procedure—in the following order (1) Pass that PDF (e.g., from NRT 309 in Snort 301) to a local DLIB 317.

DLIB 317 fails the cache check 311 and queries the Dispatcher 331.

The Dispatcher 331 fails the DB check 339 and returns a token to the DLIB.

DLIB 317 passes the file to the appropriate DIN 319.

DIN 317 alerts to the Dispatcher 331, which passes the alert to the DLIB 317 and handles NRT verbose logging 335.

DLIB 317 provides the alert to Snort 301.

(2) Reset the DLIB process 317 (clearing the cache 311).

In Snort 301, capture the same malicious PDF from the same URL via a live HTTP data stream.

Pass that PDF to a local DLIB 317.

DLIB 317 fails the cache check 311 and queries the Dispatcher 331.

Dispatcher 331 responds with an alert 333 due to the existence of an entry in the URL DB 343.

DLIB 317 updates its cache 311, 315 and provides the alert to Snort 301.

(3) In Snort 301, capture the same malicious PDF from the same URL via a live HTTP data stream.

Pass that PDF to a local DLIB 317.

DLIB 317 alerts due to the presence of an entry in the local URL cache 315.

(4) Reset the DLIB process 317 (clearing the cache 311).

In Snort 301, capture the same malicious PDF from a different URL via a live HTTP data stream.

Pass that PDF to a local DLIB 317.

DLIB 317 fails the cache check 311 and queries the Dispatcher 331.

Dispatcher 331 responds 333 with an alert due to the existence of an entry in the MD5 DB 341.

DLIB 317 updates its cache 311, 313 and provides the alert to Snort 301.

(5) In Snort 301, capture the same malicious PDF from a third URL via a live HTTP data stream.

Pass that PDF to a local DLIB 317.

DLIB 317 alerts due to the presence of an entry in the local MD5 cache 313.

Expected Result

Five alerts should occur: An initial alert, an alert on the global URL DB 343, an alert on the local URL cache 315, an alert on the global MD5 DB 341 and finally an alert on the local MD5 cache 313.

The system, method and computer readable medium described above provide for one or more of:

UID sum tracking of subcomponents to files

Full file parsing targeting specific attack triggering conditions

File based detection based on full files pulled from network traffic, allowing for detection without the overhead of managing client-side AV systems Scalable, distributed method of inspecting files Redistributed detection based on embedded files and difficult detection problems determined by file parsing (multiple system evaluation of a single file)

Centralized database of UIDs determined to be good or bad based on detection capability, as opposed to provided by a vendor.

Extensible detection nugget system that allows for existing and custom developed detection systems to be plugged into the NRT alerting structure Extensible alerting system to leverage the detection capability to update new and existing real-time detection systems Retroactive alerting based on both full file and sub-component UIDs FIG. 5 and FIG. 6 now will be discussed together, with respect to a system and method for unifying detection via detection routing that provides alternative embodiments to the foregoing.

There are currently no known equivalents of a system that allows for both arbitrary data tagging and a declaration of interest from arbitrary systems as well as a mechanism for ensuring the routing of that data to interested systems.

In a standard network environment, data is analyzed at the capture location (e.g. an anti-virus attached to a mail-gateway). This limits detection to only that system and forgoes the opportunity for other detection systems to evaluate the data.

This results in both a repetition of work because multiple systems evaluate data that has already been checked. This also reduces the overall capability of the system because data that does not reach an individual system will not be evaluated.

The embodiment described in the following can separate the data capture and data analysis function, allowing for data captured anywhere in the network to be forwarded to all detection systems. This approach allows for multiple, disparate detection systems to be tied together into a single set of detection. This can assist with detection effectiveness and the ROI for investments in detection systems.

In this embodiment, the dispatcher is as discussed above, and also maintains a table of interested detection systems and maintains a list of previously evaluated data. The dispatcher can track data by universally unique identifiers (UUID), allowing for approximately $3 \times 10^{38}$ unique data types to be declared. This can allow for an unlimited number of data types to be declared and maintained by the system.

Referring now to FIG. 5, an example UUID table will be discussed and described. The UUIDs known by the system can be maintained in a table, for example Known UUID Table 501.

UIDs (in the UID column 503) that are marked as "Global" (in the "Global" column 505) indicate that they are provided as part of the entire system, and that they are unique across all implementations of the system. UIDS that are not marked "Global" are unique to individual enterprises and are not available to the entirety of system users. This system of UIDs provides significant extensibility for enterprise-specific detection needs.

On startup, each detection component can register with the Dispatcher. As part of this registration process, the detection component (such as DIN 319, 419) can declare, by UUID, the kind of data that it is interested in. The dispatcher then sets up a detection routing table, as illustrated for example in FIG. 6.

Figure 6:
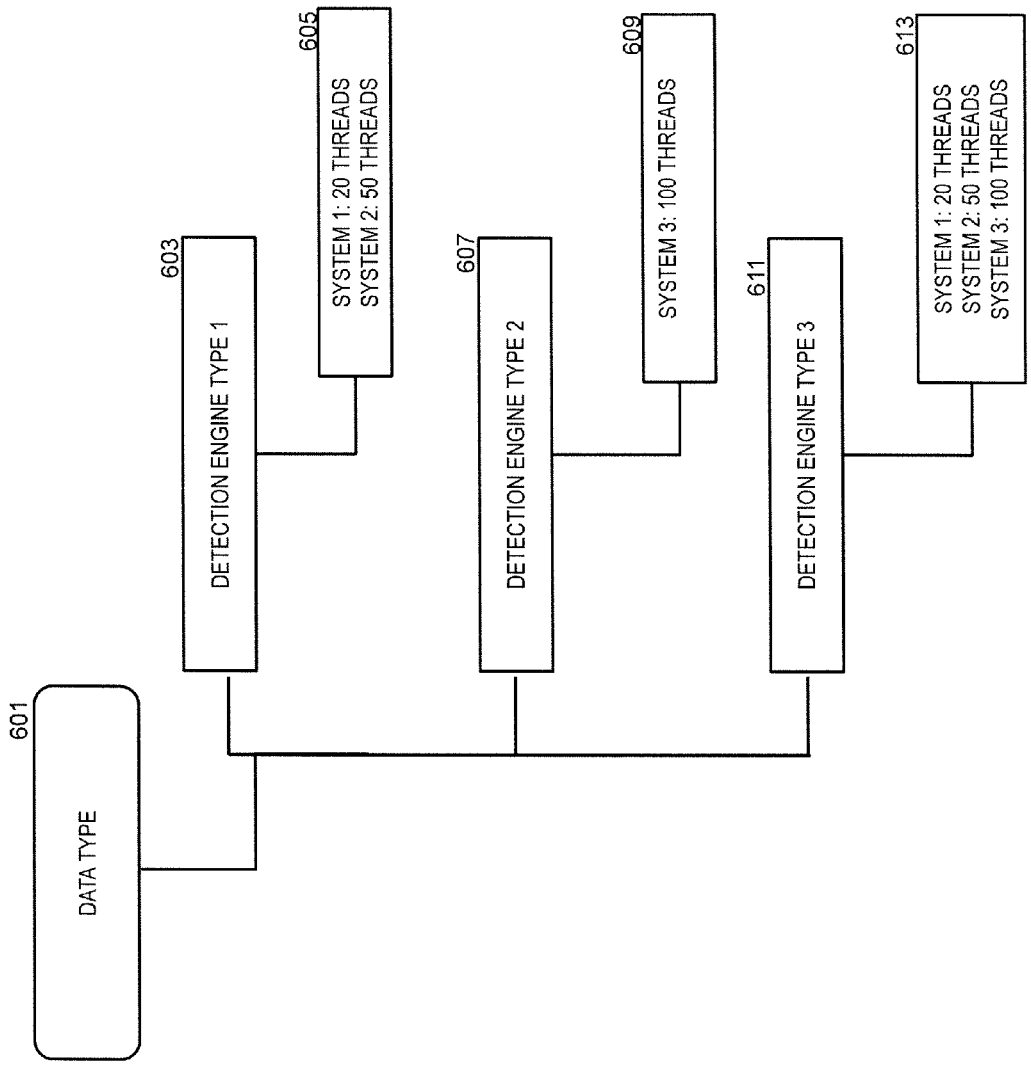
FIG. 6 is an example UUID (universally unique identifier) table.

Referring now to FIG. 6, a block diagram illustrating a detection routing table will be discussed and described. The detection routing table ensures that, for any given data type 601, one of each type of detection component (in FIG. 6, "Detection Engine Type" 603, 607, 611) can be linked thereto so as to have an opportunity to evaluate that block of data. Each of the detection engine types 603, 607, 611 can be different. Further, the table maintains an understanding of the number of resources (e.g., available threads for different systems 605, 609, 613) available for a given type of detection component 603, 607, 611, allowing the Dispatcher to direct additional components to come online or to convert existing components to a new type. In FIG. 6, only one data type 601 is illustrated in the detection routing table which is illustrative of plural different data types 601 therein, each with their own tree of detection engine types.

Data collectors can have sufficient intelligence to capture data and tag it appropriately. Once a data collector captures the data, it can send a set of data that uniquely identifies that data block and check to see if it has been evaluated before. If the data has been previously evaluated, the data is discarded without impacting the detection systems. If the data has not been previously evaluated, the dispatcher compares the data type to the detection routing table and ensures that one copy of that data reaches each kind of detection component that has declared an interest in that data.

For example, an anti-virus system could have a front-end to the system that declares an interest in PDF files (as in the "description" column FIG. 5, 507) (globally identified as "005d5464-7a44-4907-af57-4 db08a61e13c"). A custom built PDF analyzer could also be tied into the system.

Finally, as a further embodiment, a sandbox system can be tied into the system. A sandbox is a known technique. As the systems come online, for example, or thereafter they can register with the dispatcher that they are interested in PDF files and provides the dispatcher a description of the resources available for detection and what IP/port combination data should be sent to. The dispatcher then builds a defense routing table (sometimes referred to herein as a "data routing table") for PDF files with entries for each of the three type of detection components.

When a data collector captures a PDF file, it can run one or more algorithms on that file to uniquely identify its UID. It then can transmit that information, along with the PDF File UID to declare the data type, to the dispatcher. If the data has been seen before by the dispatcher, the system discards the data. If it has not been seen before, the dispatcher evaluates the provided data type UID against the routing table and ensures the data reaches one instance of one or more type of detection engine: AV, custom analyzer and sandbox.

The system, method and computer readable medium described above provide for a combination of one or more of:

A detection system, method, apparatus, and/or non-transitory computer-readable medium that separates the data capture and data evaluation systems.

A detection system, method, apparatus, and/or non-transitory computer-readable medium that provides for an array of detection capabilities to be available to analyze a single input of data.

A routing mechanism in connection with a system, method, apparatus, and/or non-transitory computer-readable medium as described in the foregoing that can handle arbitrary data, tagged with a known data type identifier, by routing that data to a subset of detection components from an array of detection capability based on data from those detection components about the type of data said detection components can handle.

A system, method, apparatus, and/or non-transitory computer-readable medium with the foregoing that can reduce unnecessary sequential processing by providing a system that ensures only a single system of each component type evaluates any given piece of data and that any unique piece of data is only evaluated once.

Figure 7:
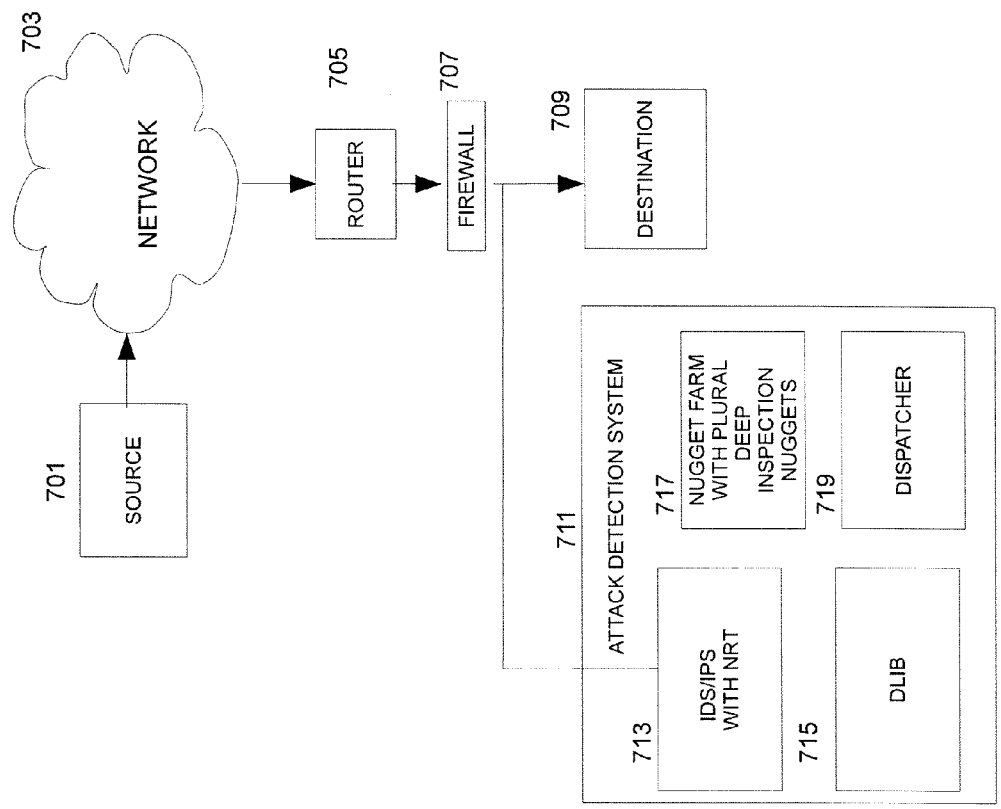
FIG. 7 is a diagram illustrating a simplified and representative environment associated with file analysis according to a first embodiment.

Referring now to FIG. 7, a diagram illustrating a simplified and representative environment associated with file analysis according to a first embodiment will be discussed and described.

In the illustration, a source 701 (such as a computer system) transmits a transmission to a destination 709. The transmission can include a file, for example, an FTP file transfer or attached to an e-mail, or the like. In this example, the transmission is transmitted via a network 703, a router 705, and a firewall 707 to the destination 709. The communications to and from the destination 709 can be monitored in accordance with well known techniques by an intrusion detection/prevention system (IDS/IPS) 713, such as with a sensor. Although this illustration provides the IDS/IPS behind the firewall 707, the IDS/IPS can be provided anywhere before the destination 709. Alternatively, the intrusion detection/prevention system 713 can be provided in-line with the destination 709, or can be incorporated into the destination 709. Alternatively, the transmission with the file can follow a reverse path, i.e., from the computer system labeled in this figure as "Destination" 709.

The illustrated attack detection system 711 includes the IDS/IPS with NRT 713, a DLIB 715, a dispatcher 719, and a nugget farm 717 with plural deep inspection nuggets, all as discussed above in detail, for example, in connection with FIG. 1 to FIG. 4. Conveniently, the DLIB, dispatcher, and nugget farm 713, 715, 717, 719 can be provided on a same processor or as a distributed processor with the IDS/IPS, that is, to process data before it is received by the destination.

Figure 8:
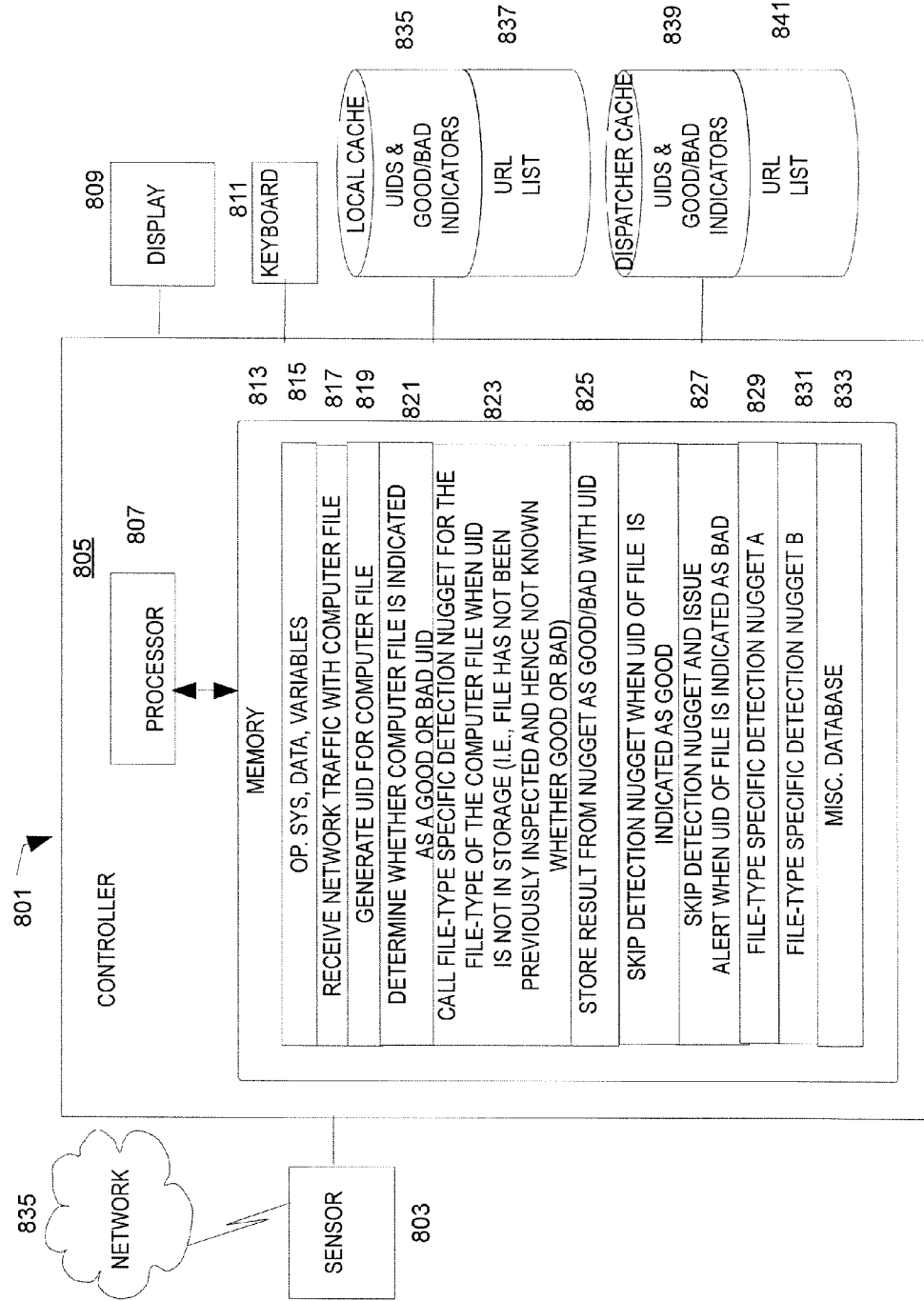
FIG. 8 is a block diagram illustrating portions of an exemplary computerized system for file analysis according to the first embodiment.

Referring now to FIG. 8, a block diagram illustrating portions of an exemplary computer system according to the first embodiment (including FIG. 2 to FIG. 4) will be discussed and described. The computer system 801, sometimes referred to herein as a "system," may include one or more controllers 805, which can receive signals from a sensor 803 which senses communications from a network 835 in accordance with known techniques, where the communications are being sent to a target (not illustrated). The controller 805 can include a processor 807, a memory 813, an optional display 809, and/or an optional user input device such as a keyboard 811.

The processor 807 (also referred to from time-to-time as a "processor device") may comprise one or more microprocessors and/or one or more digital signal processors. The memory 813 may be coupled to the processor 807 and may comprise a read-only memory (ROM), a random-access memory (RAM), a programmable ROM (PROM), and/or an electrically erasable read-only memory (EEPROM). The memory 813 may include multiple memory locations for storing, among other things, an operating system, data and variables 815 for programs executed by the processor 807; computer programs for causing the processor to operate in connection with various functions such as receiving 817 network traffic with a computer file, determining 819 whether the computer file is indicated as a good or bad UID, calling 821 a file-type specific detection nugget when the UID is not in storage, storing 823 a result from the detection nugget that the file is good or bad together with the UID, skipping 825 the detection nugget when the UID of the file is indicated as good, skipping 827 the detection nugget when the UID of the file is indicated as bad and issuing an alert, plural different file-type specific detection nuggets 829, 831 for detecting malicious or bad files, and/or other processing; a local cache for UIDs and good/bad indicators 835 and the URL list 837, a dispatcher cache for UIDs and good/bad indicates 839 and the URL list 841; and a database 833 for other miscellaneous information used by the processor 807. The computer programs may be stored, for example, in ROM or PROM and may direct the processor 807 in controlling the operation of the computer system 801. The programs are overviewed below, but details discussed elsewhere are not necessarily repeated here.

The processor 807 optionally may be programmed for receiving 817 network traffic that includes a computer file. In the illustrated example, network traffic (such as packets) are detected by the sensor 803 connected to the computer system 801 and are supplied to the computer system 801 in accordance with known techniques. The network traffic which is received carries with it a file and which is detected to be a file, in accordance with any of various known techniques.

The processor 807 may be programmed for determining 819 whether the computer file is indicated as a good or bad UID, for example by reference first to the local cache of UIDS & good/bad indicators 835. The dispatcher cache includes UIDS & good/bad indicators maintained by the dispatcher for local and remote computers, possibly throughout the network. When the local cache does not include the UID (meaning that the file has not been previously inspected locally and hence is not known whether it is good or bad), then the dispatcher cache of UIDS & good/bad indicators 839 can be referred to for this determination. When the dispatcher cache of UIDs 839 does not include the UID, that means that the file has not been previously inspected locally or remotely and is not known. Also, as previously discussed, the processor 807 can be programmed to access the URL list 837 in the local cache to determine whether the URL that originated the file is locally known as malicious, and then to access the URL list 841 in the dispatcher cache to determine whether the URL that originated the file is known to the dispatcher as malicious.

The processor 807 may be programmed for calling 821 a file-type specific detection nugget when the UID is not in storage (or as explained elsewhere is indicated as "tainted") and hence has not previously been inspected (or if "tainted" was inspected by a subsequently updated detection nugget). The file-type of the file can be determined in accordance with known techniques. The file-type specific detection nugget A, B 827, 829 which corresponds to the file-type of the file can be called to further process the file which is tainted or has not been previously inspected. Detection nuggets are discussed elsewhere in more detail.

The processor 807 may be programmed for storing 823 a result from the detection nugget that the file is good or bad together with the UID, in the UIDs & good/bad indicators 835, 839 in the local cache and the dispatcher cache. Thus, if the file is subsequently received, it will not need to be inspected but can be treated as a good file or malicious file per the good/bad indicator. Incidentally, when information is received that the URL itself is malicious, the URL list 837, 841 in the local cache and dispatcher cache are updated to list the URL as malicious. Thus, if a file is received from a URL in the URL list 837, 841, it can be treated as a malicious file.

The processor 807 may be programmed for skipping 825 the detection nugget when the UID of the file is indicated as good. There is no need to inspect a file which is already known as good; it should be safe to pass on.

The processor 807 may be programmed for skipping 827 the detection nugget when the UID of the file is indicated as bad and issuing an alert. There is no need to inspect a file which is already known as bad; it can be desirable to drop the file so it does not reach its destination, and to issue an alert for logging and reporting of the file, file details, and contents.

The processor 807 may be programmed for plural different file-type specific detection nuggets 829, 831 for detecting malicious or bad files, as previously discussed. Each of the detection nuggets (represented here by two detection nuggets 829, 831) can be programmed to inspect one type of file. This can reduce the amount of memory needed at any point in time for storing instructions for processing received files, which can result in faster processing.

The local cache for UIDs and good/bad indicators 835 and the URL list 837 can be readily accessed by the processor 807 for speedy processing of network traffic received locally. Each different computer system 801 can maintain its own local cache 835, 837.

The dispatcher cache for UIDs and good/bad indicates 839 and the URL list 841 can be local (as shown) or remote (not illustrated) if desired, so as to provide shared centrally accessible storage of results from numerous different computer systems.

An optional intrusion detection/prevention unit (not illustrated in this figure) can be included in the processor 807 can be programmed in accordance with known techniques. Optionally, the function of receiving 815 the network traffic and generating 819 the UID can be programmed into the IDS/IPS for example as a preprocessor of the network traffic.

Figure 9:
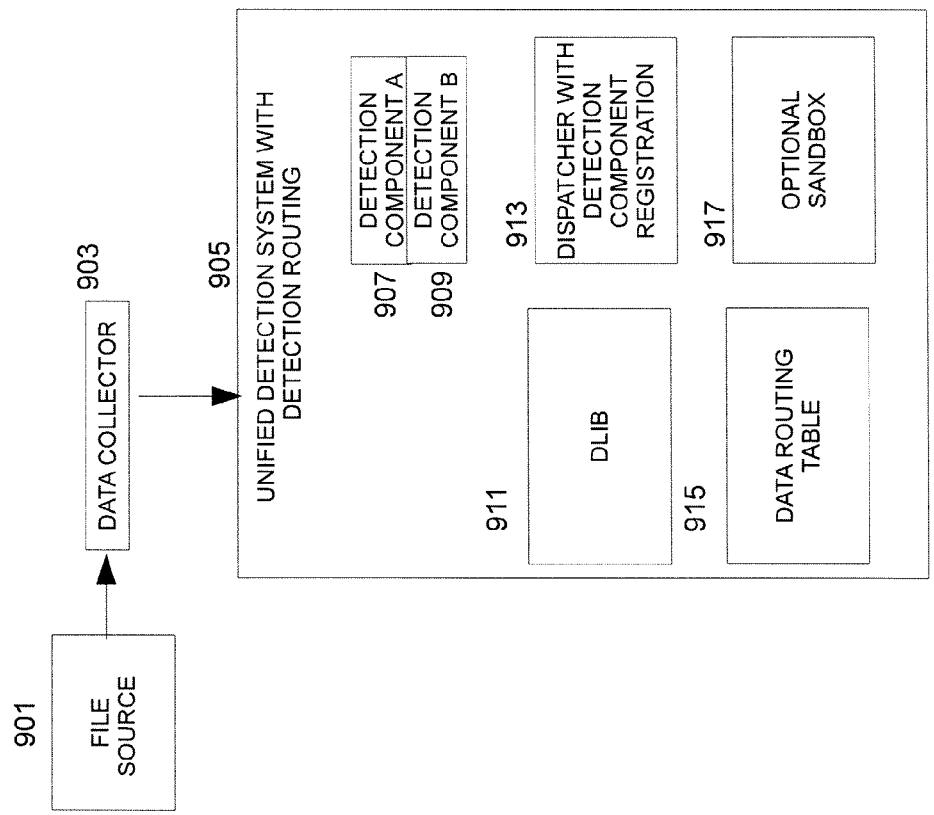
FIG. 9 is a diagram illustrating a simplified and representative environment associated with file analysis according to a second embodiment.

Referring now to FIG. 9, a diagram illustrating a simplified and representative environment associated with file analysis according to a second embodiment will be discussed and described.

In the illustration, a file source 901 (such as a computer system, server, database, electronic storage, or the like) provides a file to a data collector 903 in accordance with known techniques. The data collector 903 can be accessing files for reasons including, e.g., monitoring files, monitoring transmissions, scanning files for intrusions, or the like.

In order to have the file evaluated, the data collector 903 provides the file to a unified detection system 905 with detection routing, as discussed above. The illustrated attack detection system 905 includes a DLIB 911, a dispatcher 913, a data routing table 915, plural detection components 907, 909, and an optional sandbox 917, all as discussed above in detail, for example, in connection with FIG. 5 and FIG. 6. Conveniently, the DLIB, dispatcher, detection components, data routing table, and optional sandbox 907, 909, 911, 913, 915, 917 can be provided on a same processor (as illustrated here) or distributed amongst processors. The details of these already have been discussed in detail and will not be repeated here.

Figure 10:
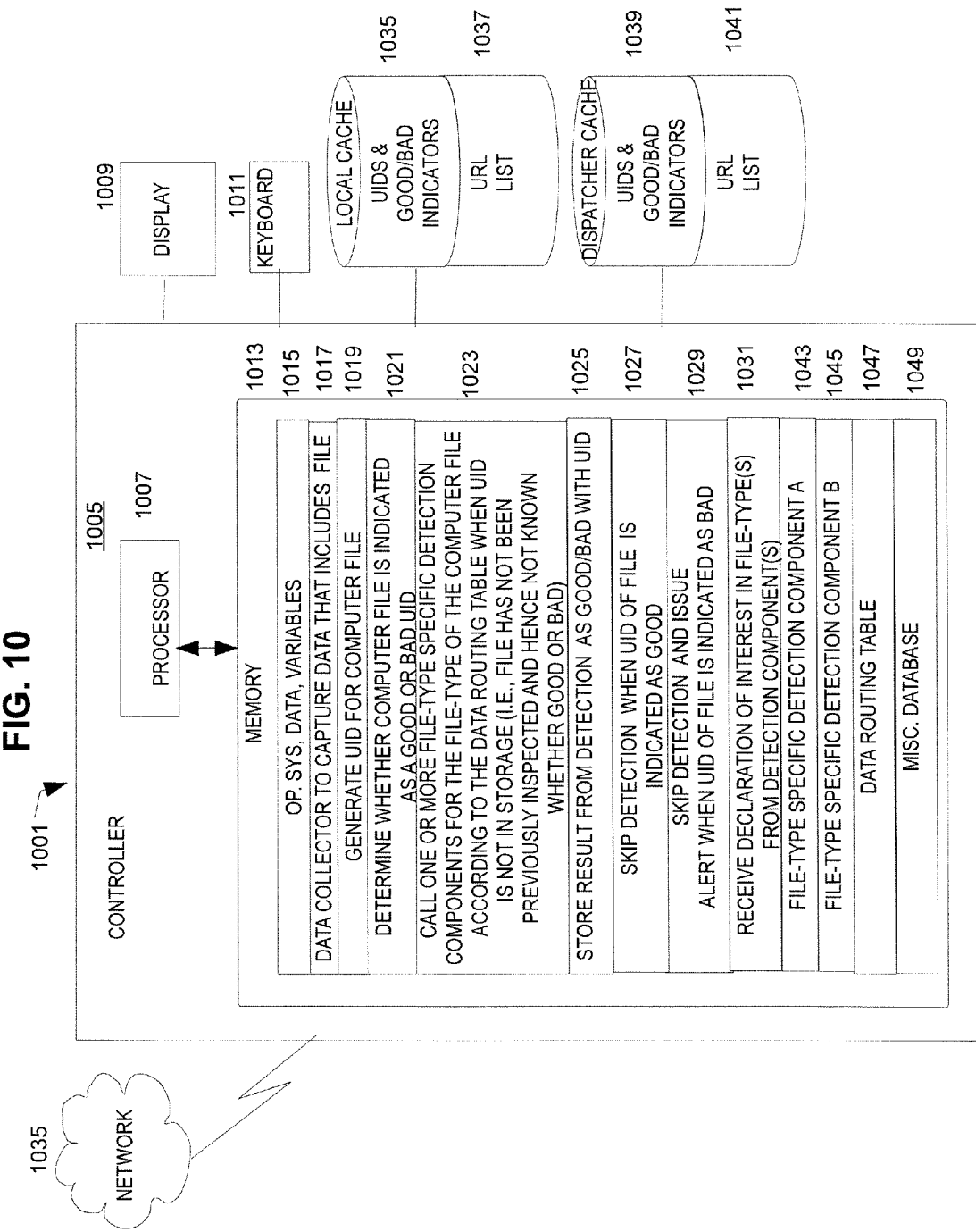
FIG. 10 is a block diagram illustrating portions of an exemplary computerized system for file analysis according to the second embodiment.

Referring now to FIG. 10, a block diagram illustrating portions of an exemplary computer system according to the second embodiment (including FIG. 5 and FIG. 6) will be discussed and described. The computer system 1001, sometimes referred to herein as a "system," may include one or more controllers 1005, which can sense communications from a network 1035 in accordance with known techniques. The controller 1005 can include a processor 1007, a memory 1013, an optional display 1009, and/or an optional user input device such as a keyboard 1011. The processor 1007 may comprise one or more microprocessors and/or one or more digital signal processors. The memory 1013 may be coupled to the processor 1007 and may comprise a read-only memory (ROM), a random-access memory (RAM), a programmable ROM (PROM), and/or an electrically erasable read-only memory (EEPROM). The memory 1013 may include multiple memory locations for storing, among other things, an operating system, data and variables 1015 for programs executed by the processor 1007; computer programs for causing the processor to operate in connection with various functions such as a data collector to capture 1017 data that includes a computer file, generating 1019 a UID for the computer file, determining 1021 whether the computer file is indicated as a good or bad UID, calling 1023 a file-type specific detection component when the UID is not in storage, storing 1025 a result from the detection nugget that the file is good or bad together with the UID, skipping 1027 the detection when the UID of the file is indicated as good, skipping 1029 the detection when the UID of the file is indicated as bad and issuing an alert, receiving 1031 a declaration of interest in one or more file-types from one or more detection components, plural different file-type specific detection components 1043, 1041 for detecting malicious or bad files, and/or other processing; a local cache for UIDs and good/bad indicators 1035 and the URL list 1037, a dispatcher cache for UIDs and good/bad indicates 1039 and the URL list 1041; a data routing table 1047; and a database 1049 for other miscellaneous information used by the processor 1007. The computer programs may be stored, for example, in ROM or PROM and may direct the processor 1007 in controlling the operation of the computer system 1001. The programs are overviewed below, but most of the details are discussed elsewhere and are not repeated here.

The processor 1007 may be programmed with a data collector that captures 1017 data that includes a computer file.

The processor 1007 may be programmed to generate 1019 a UID for the computer file, as described elsewhere, according to known techniques.

The processor 1007 may be programmed for determining 1021 whether the computer file is indicated as a good or bad UID and/or a malicious URL as discussed elsewhere, by reference to the local cache and dispatcher cache of UIDS & good/bad indicators and URL lists 1035, 1037, 1039, 1041.

The processor 1007 may be programmed for calling 1023 one or more file-type specific detection components, for the file-type per the data routing table 1047, when the UID is not in storage or is marked as "tainted."

The processor 1007 may be programmed for storing 1025 a result from the detection component(s) that the file is good or bad together with the UID, in the UIDs & good/bad indicators 1035, 1039 in the local cache and the dispatcher cache.

The processor 1007 may be programmed for skipping 1027 the detection components when the UID of the file is already indicated as good.

The processor 1007 may be programmed for skipping 1029 the detection components when the UID of the file is indicated as bad and issuing an alert.

The processor 1007 may be programmed for receiving 1031 a declaration of interest in pre-determined file-types from detection components, so that when a file is received that is the file-type it is directed only to one or more of the detection component(s) that declared interest in that file-type.

The processor 1007 may be programmed for plural different file-type specific detection components 1043, 1045 for detecting malicious or bad files, as previously discussed.

It should be understood that various logical groupings of functions are described herein. Different realizations may omit one or more of these logical groupings. Likewise, in various realizations, functions may be grouped differently, combined, or augmented. Furthermore, functions including those identified as optional can be omitted from various realizations. Similarly, the present description may describe or suggest a database or collection of data and information. One or more embodiments can provide that the database or collection of data and information can be distributed, combined, or augmented, or provided locally (as illustrated) and/or remotely (not illustrated).

Figure 11:
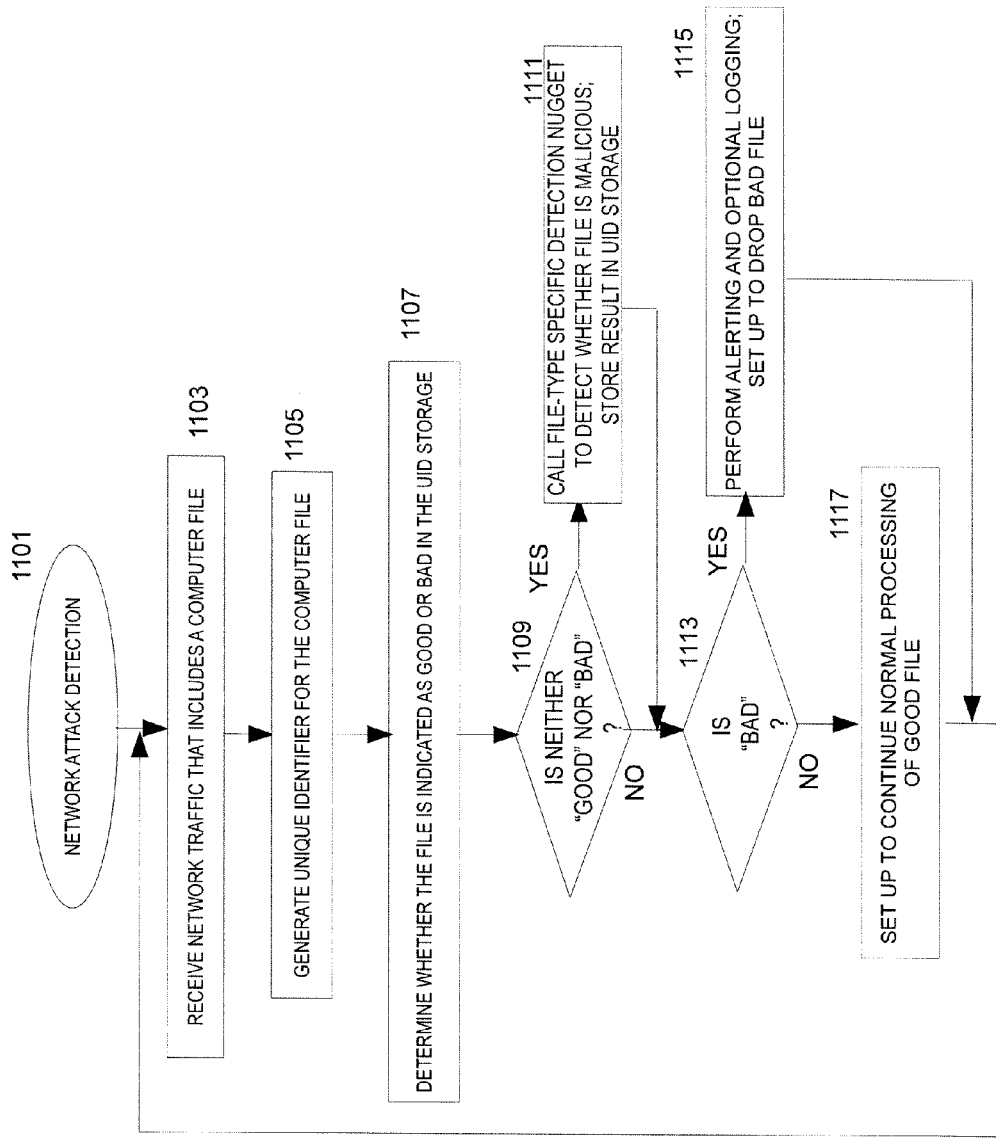
FIG. 11 is a flow chart illustrating a process for near real-time network attack detection.

Referring now to FIG. 11, a flow chart illustrating a process for near real-time network attack detection will be discussed and described. The procedure can be advantageously implemented on, for example, a processor of a computer system described in connection with FIG. 8 or other apparatus appropriately arranged.

In overview, the process 1101 can receive 1103 network traffic that includes a computer file, generate 1105 a unique identifier for the computer file, determine 1107 whether the file is indicated as good or bad based on the UID compared to a previously inspected file with the same UID as reflected in storage; if 1109 the file is not marked as "good" or "bad" (such as not present in the UID storage) then call 1111 a file-type specific detection nugget to detect whether the file is malicious and store the result in the UID storage; then, if 1113 the file is indicated as "bad" perform 1115 alerting, logging and take steps to drop the bad file; or otherwise (the file is indicated as "good") take steps to continue normal processing of the good file. Then, the process 1101 can repeat back to the top, to receive 1103 the next computer file in network traffic.

As discussed above, if the file-type specific detection nugget detects a different file-type for a subcomponent of the file (such as an embedded file), then the process can recursively process the subcomponent of the file just as if it is a computer file received in the network traffic.

Referring now to FIG. 12, a diagram illustrating a process 1201 for unified file detection will be discussed and described. The procedure can be advantageously implemented on, for example, a processor of a computer system described in connection with FIG. 10 or other apparatus appropriately arranged. Much of FIG. 12 is repetitive of FIG.

11, except dealing with file-type specific detection components that have declared interest, instead of a detection nugget. The principals will be appreciated without repeating the above. However, an overview is provided.

In overview, the process 1201 can capture 1203 data that includes a computer file, generate 1205 a unique identifier for the computer file, determine 1207 whether the file is indicated as good or bad based on the UID compared to a previously inspected file with the same UID as reflected in storage; only if 1209 the file is not marked as "good" or "bad" (such as not present in the UID storage) then the process 1201 can call 1211 one or more file-type specific detection components that previously declared interest in the file's file-type so as to detect whether the file is malicious, and store the result in the UID storage; then, if 1213 the file is indicated as "bad" the process 1201 can perform 1115 alerting and optional logging and return a resulting indicate that the file is bad; or otherwise (the file is indicated as "good") take steps to continue normal processing of the good file. Then, the process 1201 can repeat back to the top, to capture 1203 the next computer file in data.

As discussed above, if the file-type specific detection component detects a different file-type for a subcomponent of the file (such as an embedded file), then the process 1201 can recursively process the subcomponent of the file just as if it is another computer file captured in data.

Moreover, embodiments can include a computer system configured with the foregoing tangible computer-readable medium and/or method(s); and/or a communication network comprising at least one computer system configured with the foregoing computer-readable medium and/or method(s).

The MD5 function has been discussed above as an example of a known hash function that is used to generate a universally unique identifier. However, there are numerous other hash functions and/or cryptographic hash functions that can be used instead of MD5 to generate a universally unique identifier for a file, for example, HMAC, MD2, MD4, SHA-0, SHA-1, any of the SHA-2 functions, and the like, and predecessors variants and evolutions thereof. The hash function to generate a universally unique identifier for a file can incorporate the contents of the file, sometimes including the URL and/or name of the file, the name space, or the like, as is known to those of skill in the art.

The designation "universally unique identifier" is used herein to indicate an identifier that has a size and uses a generation process that makes it practically impossible for two different items to share the same identifier.

It should be noted that the communication networks of interest include those that transmit information in packets in accordance with packet processing protocols, for example, by packet switching networks that transmit data, where the packet(s) are generated by a source, the packets are transmitted, and the packets are routed over network infrastructure devices, which are sent to a destination specified in the packet(s). Such networks include, by way of example, the Internet, intranets, local area networks (LAN), wireless LANs (WLAN), wide area networks (WAN), and others. Protocols supporting communication networks that utilize packets include one or more of various networking protocols having any link layers that support the TCP transport layer, or any application that rides over the transport layer, for example, IPV4 or IPV6, and other wireless application protocols or wireline application protocols and/or other protocol structures, and variants and evolutions thereof. Such networks can provide wireless communications capability and/or utilize wireline connections such as cable and/or a connector, or similar.

The designation "file" is defined herein as a block of arbitrary information, or resource for storing information, which is readable by a computer program and stored in non-transitory electronic memory; a file remains available for programs to use after the current program has finished. Typically, a file has a file name and a path which uniquely locates the file within its storage. Plural files are typically organized within a file directory. The format of a file can be further pre-defined by a file system such as UNIX or WINDOWS or other file systems to include a file header, file data (which is the content of the file), meta data, and/or attributes. The "attributes" of a file can specify operations that can be performed on the file (for example, read, write, hidden, archive, and the like) and/or file name, file size, time stamp, and the like. The designation "file data" is defined herein to mean the content of the file (distinct from the file header, file meta data, and file attributes).

The designation "data block" refers to a block of data which has a pre-defined format with a pre-determined beginning and ending (or length), although not necessarily in a single contiguous string of data. A data block may be one or more elements of a single file, as may be defined by a file-handling system. For example, a pdf document (a file) can include plural data blocks, some of which may be compressed or include other files such as images, and the like.

Furthermore, the designation "intrusion detection/prevention system" (and IDS/IPS) is used herein to denote a device or software that passively or actively analyzes network traffic for intrusion. Examples of such devices or software are sometimes referred to as "intrusion detection system" (IDS), "intrusion prevention system" (IPS), "network intrusion detection system" (NIDS), "network intrusion protection system" (NIPS"), and the like, and variants or evolutions thereof. An intrusion detection/prevention system may be host-based, or may monitor traffic to a target system using, for example, sensors, anywhere between the target system and the intruder, typically after a final router or firewall.

The designation "in motion on a network" or "in motion on the network" is defined herein to refer to a packet, data in a packet, or a file in a packet that has been transmitted from the source host of the packet and but is observed, read or monitored before that packet has been received at the destination host of the packet.

The designation "packet" is defined herein as a unit of data formatted in accordance with a packet processing protocol such as IPV4 or IPV6, carried by a packet switching network and includes a header and data, and is sometimes referred to as an IP packet or a datagram.

A "passively detected" packet is defined herein as being one or more packets which were not elicited or initiated by the host on which the packet is read. To "passively detect" a packet is to receive a packet which was not elicited or initiated by a prior transmission from the processor on which the packet is read. An "actively identified" packet is defined herein as being one or more packets which were elicited or initiated by the host on which the packet is read, for example, by the host on which the packet is read pinging the host which is in the report.

The term "real-time" or "real time" is defined herein to mean that the analyzed (input) and/or generated (output) data (whether they are grouped together in large segments or processed individually) can be processed (or generated) continuously in the time it takes to input and/or output the same set of data independent of the processing delay.

The designation "sensor" is defined herein expressly to indicate a device including a processor whose primary functions are to detect and reports network traffic on the network to which it is attached, sometimes referred to as a security appliance, security device, or sensor appliance, and can be standalone or incorporate one or more of: a firewall, an anti-virus scanning device, a content filtering device, an intrusion detection appliance, an intrusion prevention appliance, a penetration testing appliance, a vulnerability assessment appliance, and the like. The sensor can operate inline (installed as an appliance within the network, so that traffic flows through it); as a tap (network traffic between the clients and servers is copied by the tap to the sensor which is essentially invisible to the other network entities); or in a span (traffic is spanned off either the server side or the client side of a router or switch, copying both the incoming and outgoing traffic from any of the ports). The sensor can collect information on the packets which it sees, and can be configured to transmit the collected packet information for individual packets, summaries of packets, reports, and/or as detected events. Examples of such sensors include a Sourcefire™ sensor, a McAfee™ sensor, and the like.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system, comprising:
    a storage device configured to store unique identifiers for data blocks and indications associated with the stored unique identifiers whether each of the data blocks is good or bad;
    a processor device configured to:
        receive network traffic that includes a data block;
        generate a unique identifier for the data block as the data block is received in network traffic, the unique identifier including a hash value corresponding to the data block contents;
        determine during a packet scan operation on the network traffic of the packet that includes the data block whether the data block is indicated as good or bad in the indications associated with the unique identifier in the storage device;
        call a file-type specific detection nugget corresponding to a file-type of the data block to perform a full file inspection of the data block so as to detect whether the data block is malicious, and store a result of the full file inspection indicating whether the data block is good or bad together with the unique identifier of the data block in the storage device, when the data block is determined to be not indicated in the unique identifier in the storage device;
        not call the file-type specific detection nugget when the data block is determined to be indicated as good in the unique identifier in the storage device; and
        not call the file-type specific detection nugget when the data block is determined to be indicated as bad in the unique identifier in the storage device, and issue an alert indicating that the data block that was received is bad,
    the file-type specific detection nugget is called by
        sending a notification to a dispatcher program which indicates both the file-type and that evaluation of the data block as the file-type is desired,
        receiving a token from the dispatcher program, in response to the notification, authorizing inspection by the file-type specific detection nugget,
        generating an indication of the data block and the token authorizing inspection to the file-type specific detection nugget to commence full file inspection of the data block, in response to receipt of the token, and
        providing the data block to the detection nugget, in response to receipt of the token,
    wherein there are a plurality of file-type specific detection nuggets each for file inspection of file contents of respective different file-types.

2. The system of claim 1, further comprising a nugget storage that stores the plurality of file-type specific detection nuggets, each of the file-type specific detection nuggets is configured
    to determine whether the token authorizing inspection is received and is valid,
    to provide the file inspection of the data block in accordance with its respective different file type when the token authorizing inspection specific to the file-type specific detection nugget is received and when the token that is received is determined to be valid,
    to not provide a file inspection of the data block when the token that is received is not determined to be valid, and
    to not provide the file inspection of the data block when a file inspection is requested but the token is not received.

3. The system of claim 1, wherein the file-type specific detection nugget
    creates a unique identifier for a subcomponent of the data block when the subcomponent is found with a different file-type or obfuscation scheme than handled by the file-type specific detection nugget,
    calls a different file-type specific detection nugget corresponding to the different file-type of the subcomponent to inspect contents of the subcomponent or to look for the unique identifier of the subcomponent in the storage device so as to detect whether the subcomponent is bad or good, and
    stores a result of the subcomponent inspection indicating that the subcomponent is bad and that the data block is bad together with the unique identifier of both the subcomponent and the data block in the storage device, instead of storing the indicator that the data block is good with the unique identifier of the data block in the storage device, when the inspection result of the subcomponent that is found is returned as bad or malicious.

4. The system of claim 1, wherein
    the processor device marks the unique identifier for the data block stored in the storage device with a good indicator as "tainted", when a new detection capability is added to the file-type specific detection nugget; and
    the processor device treats the data block as not being indicated in the computer storage device instead of being indicated as "good" so that the good status of the data block is verified and the "tainted" indicated is replaced after the new detection capability is added, when the data block is indicated as "tainted".

5. The system of claim 1, wherein the file-type specific detection nugget is configured to perform full file parsing that targets specific pre-determined attack triggering conditions.

6. The system of claim 1, wherein the processor is further configured to provide retroactive alerting based on full file and subcomponent processing.

7. The system of claim 1, wherein the unique identifiers stored in the storage device are obtained by a cryptographic hash calculation from full file contents for the different data blocks as each of the data blocks is received in the network traffic.

8. The system of claim 1, wherein the alert is issued to an anti-virus system attached to a mail-gateway for handling the network traffic received over the mail-gateway that contains the data block that is bad.

9. The system of claim 1, wherein the unique identifiers stored in the storage device are further indicated as "global" when they are unique to all system users, and not marked as "global" when they are unique to an individual and not unique to all system users.

10. The system of claim 1, wherein the processor device is further configured to
receive a declaration of interest in one or more file-types including the file-type from one or more file-type specific detection nuggets, and
call all of the one or more file-type specific detection nuggets that declared interest in the file-type of the data block so that each of the one or more file-type specific detection nuggets that declared interest in the file-type of the data block can inspect the data block and return a result of its own file inspection, when the data block is determined to be not indicated in the unique identifier in the storage device.

11. A system, comprising:
a storage device configured to store unique identifiers for data blocks and indications associated with the stored unique identifiers whether each of the data blocks is good or bad;
a processor device configured to:
capture data that includes a data block;
generate a unique identifier for the data block, the unique identifier including a hash value corresponding to the data block;
receive a declaration of interest in one or more file-types including a file-type of the data block from one or more file-type specific detection components;
determine whether the data block is indicated as good or bad in the indications associated with the unique identifier in the storage device;
call all of the one-or more file-type specific detection components that declared interest in the file-type of the data block so that each of the one or more file-type specific detection components that declared interest in the file-type of the data block will inspect the data block so as to detect whether the file is malicious and each return a result of its own file inspection, and store the result of the full file inspection indicating whether the file is good or bad together with the unique identifier of the data block in the storage device, when the data block is determined to be not indicated in the unique identifier in the storage device;

not call any of the one or more file-type specific detection components when the data block is determined to be indicated as good in the unique identifier in the storage device; and
not call any of the one or more file-type specific detection components when the data block is determined to be indicated as bad in the unique identifier in the storage device, and issue an alert indicating that the data block that was received is bad,
the file-type specific detection nugget is called by
sending a notification to a dispatcher program which indicates both the file-type and that evaluation of the data block as the file-type is desired,
receiving a token from the dispatcher program, in response to the notification, authorizing inspection by the file-type specific detection nugget,
generating an indication of the data block and the token authorizing inspection to the file-type specific detection nugget to commence full file inspection of the data block, in response to receipt of the token, and
providing the data block to the detection nugget, in response to receipt of the token,
wherein there are a plurality of file-type specific detection nuggets each for providing full file inspection of file contents of respective different file-types.

12. A method, comprising:
in a processor device, receiving network traffic that includes a data block;
generating a unique identifier for the data block as the data block is received in network traffic, the unique identifier including a hash value corresponding to the data block contents;
determining during a packet scan operation on the network traffic of the packet that includes the data block whether the data block is indicated as good or bad in the indications associated with the unique identifier in the storage device;
calling a file-type specific detection nugget corresponding to a file-type of the data block to perform a full file inspection of the data block so as to detect whether the file is malicious, and store a result of the full file inspection indicating whether the file is good or bad together with the unique identifier of the data block in the storage device, when the data block is determined to be not indicated in the unique identifier in the storage device;
not calling the file-type specific detection nugget when the data block is determined to be indicated as good in the unique identifier in the storage device; and
not calling the file-type specific detection nugget when the data block is determined to be indicated as bad in the unique identifier in the storage device, and issue an alert indicating that the data block that was received is bad,
the file-type specific detection nugget is called by
sending a notification to a dispatcher program which indicates both the file-type and that evaluation of the data block as the file-type is desired,
receiving a token from the dispatcher program, in response to the notification, authorizing inspection by the file-type specific detection nugget,
generating an indication of the data block and the token authorizing inspection to the file-type specific detection nugget to commence full file inspection of the data block, in response to receipt of the token, and
providing the data block to the detection nugget, in response to receipt of the token, wherein there are a plurality of file-type specific detection nuggets each for providing full file inspection of file contents of respective different file-types.

13. The method of claim 12, further comprising storing, in a nugget storage, the plurality of file-type specific detection nuggets, each of the file-type specific detection nuggets is configured
to determine whether the token authorizing inspection is received and is valid,
to provide the file inspection of the data block in accordance with its respective different file type when the token authorizing inspection specific to the file-type specific detection nugget is received and when the token that is received is determined to be valid,
to not provide a file inspection of the data block when the token that is received is determined to not be valid, and
to not provide the file inspection of the data block when a file inspection is requested but the token is not received.

14. The method of claim 12, wherein the file-type specific detection nugget
creates a unique identifier for a subcomponent of the data block when the subcomponent is found with a different file-type or obfuscation scheme than handled by the file-type specific detection nugget,
calls a different file-type specific detection nugget corresponding to the different file-type of the subcomponent to inspect contents of the subcomponent or to look for the unique identifier of the subcomponent in the storage device so as to detect whether the subcomponent is bad or good, and
stores a result of the subcomponent inspection indicating that the subcomponent is bad and that the data block is bad together with the unique identifier of both the subcomponent and the data block in the storage device, instead of storing the indicator that the data block is good with the unique identifier of the data block in the storage device, when the inspection result of the subcomponent that is found is returned as bad or malicious.

15. The method of claim 12, further comprising
marking, by the processor device, the unique identifier for the data block stored in the storage device with a good indicator as "tainted", when a new detection capability is added to the file-type specific detection nugget; and
treating the data block as not being indicated in the computer storage device instead of being indicated as "good" so that the good status of the data block is verified and the "tainted" indicated is replaced after the new detection capability is added, when the data block is indicated as "tainted".

16. The method of claim 12, further comprising performing, in the file-type specific detection nugget, full file parsing that targets specific pre-determined attack triggering conditions.

17. The method of claim 12, further comprising providing retroactive alerting based on full file and subcomponent processing.

18. The method of claim 12, further comprising obtaining the unique identifiers stored in the storage device by a cryptographic hash calculation from full file contents for the different data blocks as each of the data blocks is received in the network traffic.

19. The method of claim 12, further comprising issuing the alert to an anti-virus system attached to a mail-gateway for handling the network traffic received over the mail-gateway that contains the data block that is bad.

20. The method of claim 12, further comprising indicating the unique identifiers stored in the storage device as "global" when they are unique to all system users, and not marking the unique identifiers stored in the storage device as "global" when they are unique to an individual and not unique to all system users.

21. The method of claim 12, further comprising
receiving, in the processor device, a declaration of interest in one or more file-types including the file-type from one or more file-type specific detection nuggets, and
calling, in the processor device, all of the one or more file-type specific detection nuggets that declared interest in the file-type of the data block so that each of the one or more file-type specific detection nuggets that declared interest in the file-type of the data block can inspect the data block and return a result of its own file inspection, when the data block is determined to be not indicated in the unique identifier in the storage device.

22. A non-transitory computer readable medium comprising executable instructions for performing the method of claim 12.

23. A method, comprising:
in a storage device, storing unique identifiers for data blocks and indications associated with the stored unique identifiers whether each of the data blocks is good or bad;
in a processor device, capturing data that includes a data block;
generating a unique identifier for the data block, the unique identifier including a hash value corresponding to the data block;
receiving a declaration of interest in one or more file-types including a file-type of the data block from one or more file-type specific detection components;
determining whether the data block is indicated as good or bad in the indications associated with the unique identifier in the storage device;
calling all of the one-or more file-type specific detection component that declared interest in the file-type of the data block so that each of the one or more file-type specific detection components that declared interest in the file-type of the data block will inspect the data block so as to detect whether the file is malicious and each return a result of its own file inspection, and store the result of the full file inspection indicating whether the file is good or bad together with the unique identifier of the data block in the storage device, when the data block is determined to be not indicated in the unique identifier in the storage device;
not calling any of the one or more file-type specific detection components when the data block is determined to be indicated as good in the unique identifier in the storage device; and
not calling any of the one or more file-type specific detection components when the data block is determined to be indicated as bad in the unique identifier in the storage device, and issuing an alert indicating that the data block that was received is bad,
the file-type specific detection nugget is called by
sending a notification to a dispatcher program which indicates both the file-type and that evaluation of the data block as the tile-type is desired,
receiving a token from the dispatcher program, in response to the notification, authorizing inspection by the file-type specific detection nugget,
generating an indication of the data block and the token authorizing inspection to the file-type specific detection nugget to commence full file inspection of the data block, in response to receipt of the token, and providing the data block to the detection nugget, in response to receipt of the token, wherein there are a plurality of file-type specific detection nuggets each for providing full file inspection of file contents of respective different file-types.

24. A non-transitory computer readable medium comprising executable instructions for performing the method of claim 23.

* * * * *

UNITED STATES PATENT AND TRADEMARK OFFICE
CERTIFICATE OF CORRECTION

| | |
|---|---|
| PATENT NO. | : 8,677,486 B2 |
| APPLICATION NO. | : 13/086819 |
| DATED | : March 18, 2014 |
| INVENTOR(S) | : Matthew Olney et al. |

Page 1 of 1

It is certified that error appears in the above-identified patent and that said Letters Patent is hereby corrected as shown below:

Claims

Column 24, Line 23, insert the words --providing full-- after the word "for"
Column 28, Line 60, change "tile-type" to --file-type--

Signed and Sealed this
Twenty-seventh Day of October, 2015

Michelle K. Lee
*Director of the United States Patent and Trademark Office*